(12) United States Patent
Jung et al.

(10) Patent No.: US 12,130,987 B2
(45) Date of Patent: Oct. 29, 2024

(54) SENSOR DEVICE AND A METHOD OF DRIVING THE SAME

(71) Applicant: SAMSUNG DISPLAY CO., LTD., Yongin-si (KR)

(72) Inventors: Keum Dong Jung, Yongin-si (KR); Oh Jo Kwon, Yongin-si (KR); Ji Woong Kim, Yongin-si (KR); Hyung Gun Ma, Yongin-si (KR); Seong An Park, Yongin-si (KR); Sang Hyun Heo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/075,845

(22) Filed: Dec. 6, 2022

(65) Prior Publication Data
US 2023/0305657 A1    Sep. 28, 2023

(30) Foreign Application Priority Data
Mar. 25, 2022    (KR) ........................ 10-2022-0037414

(51) Int. Cl.
*G06F 3/041* (2006.01)
*G06F 1/04* (2006.01)
*G06F 3/044* (2006.01)

(52) U.S. Cl.
CPC .............. *G06F 3/0418* (2013.01); *G06F 1/04* (2013.01); *G06F 3/0446* (2019.05)

(58) Field of Classification Search
CPC ........ G06F 3/0418; G06F 1/04; G06F 3/0446; G06F 3/041; G06F 3/044
See application file for complete search history.

(56) References Cited

U.S. PATENT DOCUMENTS 7,099,496 B2    8/2006    Benkley, III
8,975,963 B2    3/2015    Sharma et al.
(Continued)

FOREIGN PATENT DOCUMENTS

KR    10-2018-0015025    2/2018
KR    10-2018-0025228    3/2018
(Continued)

OTHER PUBLICATIONS

Seunghoon Ko, "A Mutual Capacitance Touch Readout IC with Synchronization in Touch and Mobile Display Driving for High Refresh Rate AMOLED Panels", Micromachines 2021, 12, 922, Jul. 31, 2021, 12 pages.
(Continued)

*Primary Examiner* — Md Saiful A Siddiqui
(74) *Attorney, Agent, or Firm* — F. CHAU & ASSOCIATES, LLC

(57) ABSTRACT

A sensor device including: first sensors; second sensors configured to form capacitances with the first sensors; a sensor transmitter connected to the first sensors and configured to supply driving signals having a first frequency to the first sensors; and a sensor receiver connected to the second sensors and configured to receive sensing signals from the second sensors, wherein the sensor receiver includes: a multipath filter having a center frequency set to the first frequency; and a first chopper integrator connected to the multipath filter, and having a center frequency set to the first frequency.

15 Claims, 21 Drawing Sheets

(56) References Cited

U.S. PATENT DOCUMENTS

| | | | |
|---|---|---|---|
| 9,014,653 B2 | 4/2015 | Madadi et al. | |
| 9,634,702 B2 | 4/2017 | Jabbour et al. | |
| 9,639,733 B2 | 5/2017 | Kremin et al. | |
| 9,847,772 B2 | 12/2017 | Darvishi et al. | |
| 10,120,509 B2 | 11/2018 | Chandran et al. | |
| 10,128,819 B2 | 11/2018 | Hedayati et al. | |
| 10,146,985 B2 | 12/2018 | Chung et al. | |
| 10,732,766 B2 | 8/2020 | Malhotra | |
| 11,481,072 B2 | 10/2022 | Fan | |
| 2012/0206404 A1 | 8/2012 | Chan et al. | |
| 2013/0033442 A1 | 2/2013 | Chu et al. | |
| 2013/0106759 A1* | 5/2013 | Fredriksen | G06F 3/0446 345/174 |
| 2013/0300690 A1* | 11/2013 | Yang | G06F 3/044 345/173 |
| 2014/0078101 A1* | 3/2014 | Katsurahira | G06F 3/0442 345/174 |
| 2015/0242672 A1 | 8/2015 | Benkley, III et al. | |
| 2016/0117051 A1 | 4/2016 | Han et al. | |
| 2017/0185182 A1 | 6/2017 | Chandran et al. | |
| 2017/0235423 A1 | 8/2017 | Hwang | |
| 2018/0039809 A1 | 2/2018 | Chung et al. | |
| 2018/0061307 A1 | 3/2018 | Inoue et al. | |
| 2018/0157355 A1 | 6/2018 | Kim | |
| 2018/0278442 A1* | 9/2018 | Rogers | H04L 25/03828 |
| 2019/0257870 A1 | 8/2019 | Shimada | |
| 2020/0089385 A1* | 3/2020 | Han | G06F 3/04166 |
| 2020/0371620 A1* | 11/2020 | Wu | G06F 3/0445 |
| 2021/0313401 A1 | 10/2021 | Lee et al. | |
| 2023/0176668 A1 | 6/2023 | Ma et al. | |
| 2023/0185403 A1* | 6/2023 | Kang | G06F 3/04184 345/173 |

FOREIGN PATENT DOCUMENTS

| | | |
|---|---|---|
| KR | 10-1931077 | 12/2018 |
| KR | 10-1986371 | 5/2019 |
| KR | 10-2249736 | 5/2021 |
| KR | 10-2021-0123454 | 10/2021 |

OTHER PUBLICATIONS

Seunghoon Ko et al., "Low Noise Capacitive Sensor for Multi-touch Mobile handset's applications", IEEE, 11836069, Nov. 8-10, 2010, 4 pages.

Jiren Yuan, "A Charge Sampling Mixer With Embedded Filter Function for Wireless Applications", ICMMT 2000. 2000 2nd International Conference on Microwave and Millimeter Wave Technology Proceedings, 6826148, Sep. 14-16, 2000, pp. 315-318.

* cited by examiner

SENSOR DEVICE AND A METHOD OF DRIVING THE SAME

CROSS-REFERENCE TO RELATED APPLICATION

The present application claims priority under 35 U.S.C. § 119 to Korean patent application number 10-2022-0037414 filed on Mar. 25, 2022, the disclosure of which is incorporated by reference herein in its entirety.

TECHNICAL FIELD

Various embodiments of the present disclosure relate to a sensor device and a method of driving the sensor device.

DESCRIPTION OF RELATED ART

As information technology develops, display devices, which are a connection medium between users and information, play a major role. Accordingly, the use of various types of display devices, such as a liquid crystal display device and an organic light-emitting display device, has increased.

The display device may include a display component, configured to display an image, and a sensor component (for example, a touch sensor), configured to sense input from a user (for example, a touch position). In the sensor component, signals of a target frequency band may be obtained from sensing signals to accurately detect a touch position. Generally, the sensor component may use an integrator to integrate the sensing signals. As the number of integrations performed by the integrator increases, the accuracy of the detected touch position may increase.

However, as the driving speed of the display component increases, a high touch report rate is needed. Further, as the surface area of the display component increases, the sensing time allocated to each sensing channel is reduced. Therefore, the number of integrations performed by the integrator is reduced, and the accuracy of the detected touch position may decrease.

SUMMARY

Various embodiments of the present disclosure are directed to a sensor device that has an increased signal-to-noise ratio so that a touch position can be accurately detected even if an allocated sensing time is reduced, and a method of driving the sensor device.

An embodiment of the present disclosure may provide a sensor device including: first sensors; second sensors configured to form capacitances with the first sensors; a sensor transmitter connected to the first sensors and configured to supply driving signals having a first frequency to the first sensors; and a sensor receiver connected to the second sensors and configured to receive sensing signals from the second sensors, wherein the sensor receiver includes: a multipath filter having a center frequency set to the first frequency; and a first chopper integrator connected to the multipath filter, and having a center frequency set to the first frequency.

The first chopper integrator may include: an amplifier; and a chopper circuit connected between an input terminal of the amplifier and an output terminal of the multipath filter.

The first chopper integrator may include: a first integration capacitor connected between a first input terminal and a first output terminal of the amplifier; and a first reset switch connected in parallel to the first integration capacitor.

The first chopper integrator may include: a second integration capacitor connected between a second input terminal and a second output terminal of the amplifier; and a second reset switch connected in parallel to the second integration capacitor.

The chopper circuit may include: a first switch configured to connect a first output terminal of the multipath filter to the first input terminal of the amplifier; a second switch configured to connect a second output terminal of the multipath filter to the second input terminal of the amplifier; a third switch configured to connect the first output terminal of the multipath filter to the second input terminal of the amplifier; and a fourth switch configured to connect the second output terminal of the multipath filter to the first input terminal of the amplifier.

A period during which the first switch and the second switch are turned on may not overlap a period during which the third switch and the fourth switch are turned on.

The first switch and the second switch may be turned on in response to a first clock signal, the third switch and the fourth switch may be turned on in response to a second clock signal, a frequency of the first clock signal and a frequency of the second clock signal may be identical with the first frequency, and the first clock signal and the second clock signal may differ in phase from each other.

The multipath filter may include a plurality of paths connected in parallel to each other between an input terminal of the multipath filter and an output terminal of the multipath filter, a first path of the plurality of paths may successively include a first input mixer, a first filter, and a first output mixer, and a frequency and a phase of a first input clock signal received by the first input mixer may be identical with a frequency and a phase of a first output clock signal received by the first output mixer.

A second path of the plurality of paths may successively include a second input mixer, a second filter, and a second output mixer, a frequency and a phase of a second input clock signal received by the second input mixer may be identical with a frequency and a phase of a second output clock signal received by the second output mixer, the frequency of the first input clock signal may be identical with the frequency of the second input clock signal, and the phase of the first input clock signal may differ from the phase of the second input clock signal.

The multipath filter may include a plurality of first paths, connected in parallel to each other between a first input terminal and a first output terminal, and a plurality of second paths, connected in parallel to each other between a second input terminal and a second output terminal, and the first paths and the second paths may share filters.

One of the first paths may successively include a first input mixer, a first filter, and a first output mixer, one of the second paths may include a second input mixer and a second output mixer, an output terminal of the second input mixer may be connected to an input terminal of the first filter, and an input terminal of the second output mixer may be connected to an output terminal of the first filter.

A frequency and a phase of a first input clock signal received by the first input mixer may be identical with a frequency and a phase of a first output clock signal received by the first output mixer, a frequency and a phase of a second input clock signal received by the second input mixer may be identical with a frequency and a phase of a second output clock signal received by the second output mixer, the frequency of the first input clock signal may be identical with the frequency of the second input clock signal, and the phase of the first input clock signal may differ from the phase of the second input clock signal.

The sensor receiver may further include a second chopper integrator connected to an output terminal of the multipath filter and having a center frequency set to the first frequency.

A frequency of a clock signal provided to the first chopper integrator may be identical with a frequency of a clock signal provided to the second chopper integrator, and a phase of the clock signal provided to the first chopper integrator may differ from a phase of the clock signal provided to the second chopper integrator.

The phase of the clock signal provided to the first chopper integrator may differ by 90° from the phase of the clock signal provided to the second chopper integrator.

An embodiment of the present disclosure may provide a method of driving a sensor device including: supplying driving signals having a first frequency to first sensors; receiving sensing signals from two adjacent second sensors configured to form a capacitance with the first sensors; amplifying a difference between the sensing signals; filtering the amplified signal through a multipath filter having a center frequency set to the first frequency; and integrating an output signal of the multipath filter through a first chopper integrator having a center frequency set to the first frequency.

The first chopper integrator may include: an amplifier; a chopper circuit connected between input terminals of the amplifier and output terminals of the multipath filter; a first integration capacitor connected between a first input terminal of the amplifier and a first output terminal of the amplifier; a first reset switch connected in parallel to the first integration capacitor; a second integration capacitor connected between a second input terminal of the amplifier and a second output terminal of the amplifier; and a second reset switch connected in parallel to the second integration capacitor.

The chopper circuit may include: a first switch configured to connect a first output terminal of the multipath filter to the first input terminal of the amplifier; a second switch configured to connect a second output terminal of the multipath filter to the second input terminal of the amplifier; a third switch configured to connect the first output terminal of the multipath filter to the second input terminal of the amplifier; and a fourth switch configured to connect the second output terminal of the multipath filter to the first input terminal of the amplifier.

A period during which the first switch and the second switch are turned on may not overlap a period during which the third switch and the fourth switch are turned on.

The first switch and the second switch may be turned on in response to a first clock signal, the third switch and the fourth switch may be turned on in response to a second clock signal, a frequency of the first clock signal and a frequency of the second clock signal may be identical with the first frequency, and the first clock signal and the second clock signal may differ in phase from each other.

An embodiment of the present disclosure may provide a sensor device including: first sensors configured to receive driving signals having a first frequency; second sensors that are adjacent to each other and configured to form a capacitance with the first sensors; an amplifier configured to receive sensing signals from the two adjacent second sensors and amplify a difference between the sensing signals; a band-pass filter configured to filter the amplified signal through a multipath filter having a center frequency set to the first frequency; and a chopper integrator having a center frequency set to the first frequency and configured to receive an output signal of the multipath filter.

DETAILED DESCRIPTION OF THE EMBODIMENTS

Figure 1:
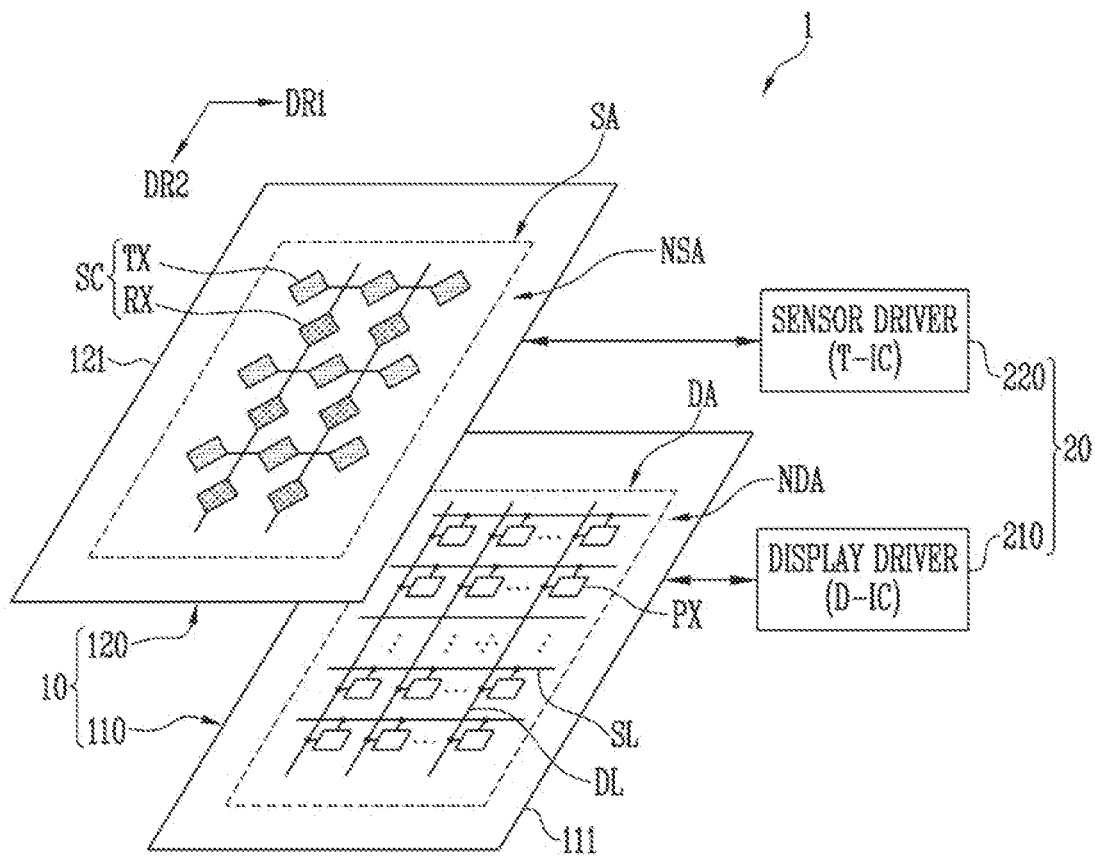
FIGS. 1 and 2 are diagrams for describing a display device in accordance with an embodiment of the present disclosure.

Hereinafter, embodiments of the present disclosure will be described in detail with reference to the attached drawings. The present disclosure may be implemented in various forms, and is not limited to the embodiments to be described herein below.

In the drawings, similar reference numerals are used to designate similar components.

In the drawings, the size of each component is arbitrarily represented for the sake of explanation, and the present disclosure is not limited thereto. In the drawings, the thicknesses of the components may be exaggerated to clearly depict multiple layers and areas.

Herein, the expression "being the same" may mean "being substantially the same". In other words, the expression "being the same" may include a range that can be tolerated by those skilled in the art.

Figure 2:
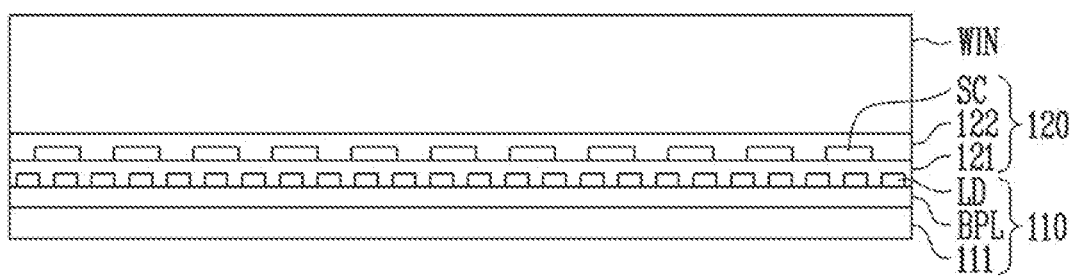

FIGS. 1 and 2 are diagrams for describing a display device 1 in accordance with an embodiment of the present disclosure.

Referring to FIG. 1, the display device 1 in accordance with an embodiment of the present disclosure may include a panel 10 and a driving circuit component 20 configured to drive the panel 10.

For example, the panel 10 may include a display component 110, configured to display an image, and a sensor component 120, configured to sense a touch, pressure, a fingerprint, hovering, or the like. For example, the panel 10 may include pixels PX, and sensors SC, which overlap at least some of the pixels PX. In an embodiment, the sensors SC may include first sensors TX and second sensors RX. In another embodiment (e.g., a self-capacitance scheme), the sensors SC may be formed of one type of sensor, regardless of whether they are the first sensors or the second sensors. The driving circuit component 20 may include a display driver 210 (D-IC), configured to drive the display component 110, and a sensor driver 220 (T-IC), configured to drive the sensor component 120. For example, the pixels PX may display an image at each display frame period. For example, the sensors SC may sense input from a user at each sensing frame period. The sensing frame period and the display frame period may be independent from each other, and may be different from each other. For example, the sensing frame period may be shorter than the display frame period. The sensing frame period and the display frame period may be synchronized with each other, or may not be synchronized.

In an embodiment, the display component 110 and the sensor component 120 may be separately fabricated, and may then be disposed and/or coupled with each other such that at least portions of areas thereof overlap each other. Alternatively, in an embodiment, the display component 110 and the sensor component 120 may be integrally fabricated. For example, the sensor component 120 may be directly formed on at least one substrate (e.g., an upper and/or lower substrate of a display panel, or a thin film encapsulation layer) that forms the display component 110, or other insulating layers or various functional layers (e.g., an optical layer or a protective layer).

Although FIG. 1 illustrates that the sensor component 120 is a front side of the display component 110 (e.g., an upper surface, on which an image is displayed), the position of the sensor component 120 is not limited thereto. For example, in an embodiment, the sensor component 120 may be disposed on a rear surface or on opposite surfaces of the display component 110. In an embodiment, the sensor component 120 may be disposed on at least one side of a peripheral area of the display component 110.

The display component 110 may include a display substrate 111 and a plurality of pixels PX formed on the display substrate 111. The pixels PX may be disposed in a display area DA of the display substrate 111.

For example, the display substrate 111 may include the display area DA, formed to display an image, and a non-display area NDA, provided around the periphery of the display area DA. In an embodiment, the display area DA may be disposed in a central portion of the display component 110, and the non-display area NDA may be disposed in the peripheral area of the display component 110 to enclose the display area DA.

The display substrate 111 may be a rigid substrate or a flexible substrate, and the material or properties thereof are not particularly limited. For example, the display substrate 111 may be a rigid substrate made of glass or reinforced glass, or a flexible substrate formed of a thin film made of plastic or metal.

Scan lines SL, data lines DL, and pixels PX connected to the scan lines SL and the data lines DL may be disposed in the display area DA. The pixels PX may be selected by a scan signal that has a turn-on level and is supplied from the scan lines SL, may be supplied with a data signal from the data lines DL, and may emit light having a luminance corresponding to the data signal. Consequently, an image corresponding to the data signal is displayed on the display area DA. In the present disclosure, the structure of the pixels PX and the method of driving the pixels PX are not particularly limited. For example, each of the pixels PX may be implemented as a pixel that can employ various known structures and driving methods.

Various lines and/or internal circuits which are connected to the pixels PX of the display area DA may be disposed in the non-display area NDA. For example, a plurality of lines for supplying various power and control signals to the display area DA may be disposed in the non-display area NDA. In addition, a scan driver and the like may also be disposed in the non-display area NDA.

In the present disclosure, the type of the display component 110 is not particularly limited. For example, the display component 110 may be implemented as a spontaneous-emission-type display panel such as an organic light-emitting display panel. However, in the case in which the display component 110 is implemented as a spontaneous-emission type, each pixel PX is not limited to the case where the pixel PX includes only an organic light emitting element. For example, the light emitting element of each pixel PX may be formed of an organic light emitting diode, an inorganic light emitting diode, a quantum dot/well light emitting diode, or the like. A plurality of light emitting elements may be provided in each pixel PX. Here, the plurality of light emitting elements may be connected in series, parallel, or series-parallel to each other. Alternatively, the display component 110 may be implemented as a non-emission-type display panel such as a liquid crystal display panel. In the case in which the display component 110 is implemented as a non-emission type, the display device 1 may further include a light source such as a backlight unit.

The sensor 120 may include a sensor substrate 121 and a plurality of sensors SC formed on the sensor substrate 121. The sensors SC may be disposed in a sensing area SA on the sensor substrate 121.

The sensor substrate 121 may include the sensing area SA, capable of sensing touch input or the like, and a peripheral area NSA, formed around the periphery of the sensing area SA. In an embodiment, the sensing area SA may be disposed to overlap at least one area of the display area DA. For example, the sensing area SA may be set to an area corresponding to the display area DA (e.g., an area overlapping the display area DA). The peripheral area NSA may be set to an area corresponding to the non-display area NDA (e.g., an area overlapping the non-display area NDA). In this case, when a touch input or the like is provided on the display area DA, the sensor component 120 may detect the touch input.

The sensor substrate 121 may be a rigid or flexible substrate, and may be formed of at least one insulating layer. Furthermore, the sensor substrate 121 may be a transparent or translucent light-transmissive substrate, but the present disclosure is not limited thereto. In other words, in the present disclosure, the material or properties of the sensor substrate 121 are not particularly limited. For example, the sensor substrate 121 may be a rigid substrate made of glass or reinforced glass, or a flexible substrate formed of a thin film made of plastic or metal. Furthermore, in an embodiment, at least one substrate (e.g., a display substrate 111, an encapsulation substrate, and/or a thin film encapsulation layer) that forms the display component 110, or at least one insulating layer, functional layer, or the like that is disposed inside and/or outside the display component 110 may be used as the sensor substrate 121.

The sensing area SA may be set to an area (e.g., an active area of the sensor TX/RX) capable of responding to touch input. To accomplish this, the sensors SC for sensing touch input or the like may be disposed in the sensing area SA. In an embodiment, the sensors SC may include the first sensors TX and the second sensors RX.

For example, each of the first sensors TX may extend in a first direction DR1. The first sensors TX may be arranged in a second direction DR2. The second direction DR2 may differ from the first direction DR1. For example, the second direction DR2 may intersect the first direction DR1. Each of the first sensors TX may have a structure in which first cells each having a relatively large surface area and first bridges each having a relatively small surface area are connected to each other. Although FIG. 1 illustrates the case in which each of the first cells has a diamond form, the first cells may have various typical forms, such as a circular form, a rectangular form, a triangular form, and a mesh form. For example, the first bridges may be integrally formed with the first cells on the same layer. In another embodiment, the first bridges may be formed on a layer different from the layer on which the first cells are formed, and may electrically connect adjacent first cells to each other.

For example, each of the second sensors RX may extend in the second direction DR2. The second sensors RX may be arranged in the first direction DR1. Each of the second sensors RX may have a shape in which second cells each having a relatively large surface area and second bridges each having a relatively small surface area are connected to each other. Although FIG. 1 illustrates that each of the second cells has a diamond form, the second cells may have various typical forms such as a circular form, a rectangular form, a triangular form, and a mesh form. For example, the second bridges may be integrally formed with the second cells on the same layer. In another embodiment, the second bridges may be formed on a layer different from the layer on which the second cells are formed, and may electrically connect the adjacent second cells to each other.

In an embodiment, each of the first sensors TX and the second sensors RX may include at least one of metal, a transparent conductive material, and various other conductive materials, and may thus be electrically conductive. For example, the first sensor TX and the second sensors RX may include at least one of various metals including gold (Au), silver (Ag), aluminum (Al), molybdenum (Mo), chrome (Cr), titanium (Ti), nickel (Ni), neodymium (Nd), copper (Cu), platinum (Pt), and the like, or an alloy thereof. Here, the first sensors TX and the second sensors RX may have a mesh form. Furthermore, the first sensor TX and the second sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, and graphene. In addition, the first sensors TX and the second sensors RX may include at least one of various conductive materials, and may thus be electrically conductive. Furthermore, each of the first sensors TX and the second sensors RX may be formed of a single layer or multiple layers, and the cross-sectional structure thereof is not particularly limited.

In the peripheral area NSA of the sensor component 120, sensor lines may be intensively disposed to electrically connect the sensors SC with the sensor driver 220 or the like.

The driving circuit component 20 may include the display driver 210, configured to drive the display component 110, and the sensor driver 220, configured to drive the sensor component 120. In an embodiment, the display driver 210 and the sensor driver 220 may be formed of separate integrated chips (ICs). In an embodiment, the display driver 210 and the sensor driver 220 may be at least partially integrated into one IC.

The display driver 210 may be electrically connected to the display component 110, and may be configured to drive the pixels PX. For example, the display driver 210 may include a data driver and a timing controller. The scan driver may be separately mounted in the display area NDA of the display component 110. In an embodiment, the display driver 210 may include all or at least some of the data driver, the timing controller, and the scan driver. In an embodiment, the display driver 210 may correspond to at least one of a graphics processing unit (GPU), a central processing unit (CPU), an application processor (AP), and the like. In another embodiment, the display driver 210 may indicate a group including at least one of a GPU, CPU, and AP, along with the timing controller.

The sensor driver 220 may be electrically connected to the sensor component 120, and may be configured to drive the sensor component 120. The sensor driver 220 may include a sensor transmitter and a sensor receiver. In an embodiment, the sensor transmitter and the sensor receiver may be integrated into one IC, but the present disclosure is not limited thereto.

Referring to FIG. 2, for example, the sensor component 120 is stacked on the display component 110, and a window WIN may be stacked on the sensor component 120.

The display component 110 may include the display substrate 111, a circuit element layer BPL formed on the display substrate 111, and light emitting elements LD formed on the circuit element layer BPL. The circuit element layer BPL may include the scan lines SL, the data lines DL, and pixel circuits configured to drive the light emitting elements LD of the pixels PXL.

The sensor component 120 may include the sensor substrate 121, the sensors SC formed on the sensor substrate 121, and a protective layer 122 provided to cover the sensors SC. In FIG. 2, there is illustrated an embodiment in which the sensor substrate 121 has the form of an encapsulation layer that covers the pixels PXL. In an embodiment, the sensor substrate 121 may be provided separately from an encapsulation layer that covers the pixels PXL.

The window WIN may be a protective component which is disposed on the uppermost surface of a module of the display device 1, and may be a substantially transparent light-transmissive substrate. The window WIN may have a multilayer structure including at least one selected from among a glass substrate, a plastic film, and a plastic substrate. The window WIN may include a rigid or flexible substrate, and the constituent material of the window WIN is not particularly limited.

The display device 1 may further include, between the window WIN and the sensor component 120, a polarizing plate (or a different type of reflection prevention layer) for prevention of external light reflection.

Figure 3:
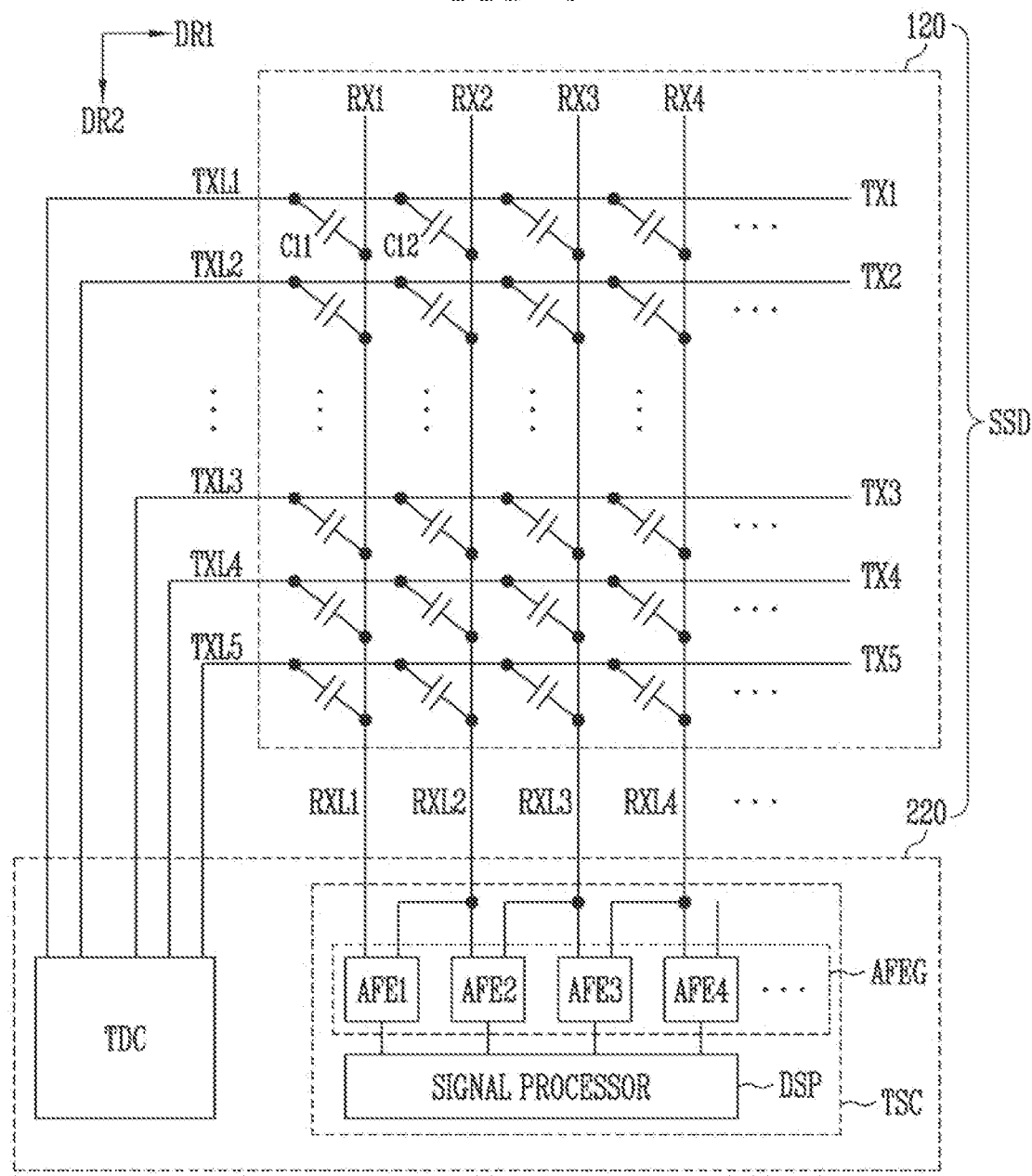
FIG. 3 is a diagram for describing a sensor device in accordance with an embodiment of the present disclosure.

FIG. 3 is a diagram illustrating a sensor device SSD in accordance with an embodiment of the present disclosure.

Referring to FIG. 3, the sensor device SSD in accordance with an embodiment of the present disclosure may include a sensor component 120 and a sensor driver 220. The sensor device SSD may be included in the display device 1. The sensor device SSD may be provided as a separate independent product that is not specific to the display device 1.

The sensor component 120 may include first sensors TX1, TX2, TX3, TX4, and TX5, and second sensors RX1, RX2, RX3, and RX4. The first sensors TX1, TX2, TX3, TX4, and TX5 may extend in the first direction DR1 and may be arranged in the second direction DR2. The second sensors RX1, RX2, RX3, and RX4 may extend in the second direction DR2 and may be arranged in the first direction DR1. The second sensors RX1, RX2, RX3, and RX4 may intersect the first sensors TX1, TX2, TX3, TX4, and TX5. The first sensors TX1, TX2, TX3, TX4, and TX5 and the second sensors RX1, RX2, RX3, and RX4 may form mutual capacitance therebetween. For example, a capacitance C11 may be formed between the first sensor TX1 and the second sensor RX1, and a capacitance C12 may be formed between the first sensor TX1 and the second sensor RX2. The sensor driver 220 may sense changes in the capacitances C11 and C12 and determine whether a user touch has been input.

The sensor driver 220 may include a sensor transmitter TDC and a sensor receiver TSC. The sensor transmitter TDC may be connected to the first sensors TX1 to TX5, and may be configured to supply driving signals to the first sensors TX1 to TX5. The sensor transmitter TDC may be connected to the first sensors TX1 to TX5 by first sensor lines TXL1, TXL2, TXL3, TXL4, and TXL5.

The sensor receiver TSC may be connected to the second sensors RX1 to RX4, and may be configured to receive sensing signals from the second sensors RX1 to RX4. The sensor receiver TSC may be connected to the second sensors RX1 to RX4 by second sensor lines RXL1, RXL2, RXL3, and RXL4. The sensor receiver TSC may include an analog front-end group AFEG and a signal processor DSP.

The analog front-end group AFEG may include a plurality of analog front ends AFE1, AFE2, AFE3, and AFE4. Each analog front-end group AFEG may be connected to two adjacent second sensors, among the second sensors RX1 to RX4. For example, the first analog front end AFE1 may be connected to the second sensor RX1 and to the second sensor RX2. The second analog front end AFE2 may be connected to the second sensor RX2 and to the second sensor RX3. The third analog front end AFE3 may be connected to the second sensor RX3 and to the second sensor RX4. The fourth analog front end AFE4 may be connected to the second sensor RX4 and to a second sensor (not shown). The analog front ends AFE1 to AFE4 may generate, using sensing signals of the adjacent second sensors as differential signals, a digital signal from which common noise has been removed, and may thus increase a signal-to-noise ratio (SNR).

The signal processor DSP may calculate sensing values using digital signals provided from the analog front-end group AFEG. For example, a digital signal provided from the first analog front end AFE1 may correspond to the difference (lv2−lv1) between the level lv2 of a sensing signal from the second sensor RX2 and the level lv1 of a sensing signal from the second sensor RX1. A digital signal provided from the second analog front end AFE2 may correspond to the difference (lv3−lv2) between the level lv3 of a sensing signal from the second sensor RX3 and the level lv2 of the sensing signal from the second sensor RX2. A digital signal provided from the third analog front end AFE3 may correspond to the difference (lv4−lv3) between the level lv4 of a sensing signal from the second sensor RX4 and the level lv3 of the sensing signal from the second sensor RX3.

For example, the signal processor DSP may obtain, using the following Equations 1 to 3, a relative level Lv2' of the sensing signal from the second sensor RX2, a relative level Lv3' of the sensing signal from the second sensor RX3, and a relative level Lv4' of the sensing signal from the second sensor RX4.

$$lv2'=lv2-lv1=(lv2-lv1) \qquad \text{[Equation 1]}$$

$$lv3'=lv3-lv1=(lv3-lv2)+(lv2-lv1) \qquad \text{[Equation 2]}$$

$$lv4'=lv4-lv1=(lv4-lv3)+(lv3-lv2)+(lv2-lv1) \qquad \text{[Equation 3]}$$

The signal processor DSP may determine whether a touch of the user has occurred using the levels lv2, lv3', and lv4' as the sensing values, or may transmit the sensing values to the display driver 210.

Figure 4:
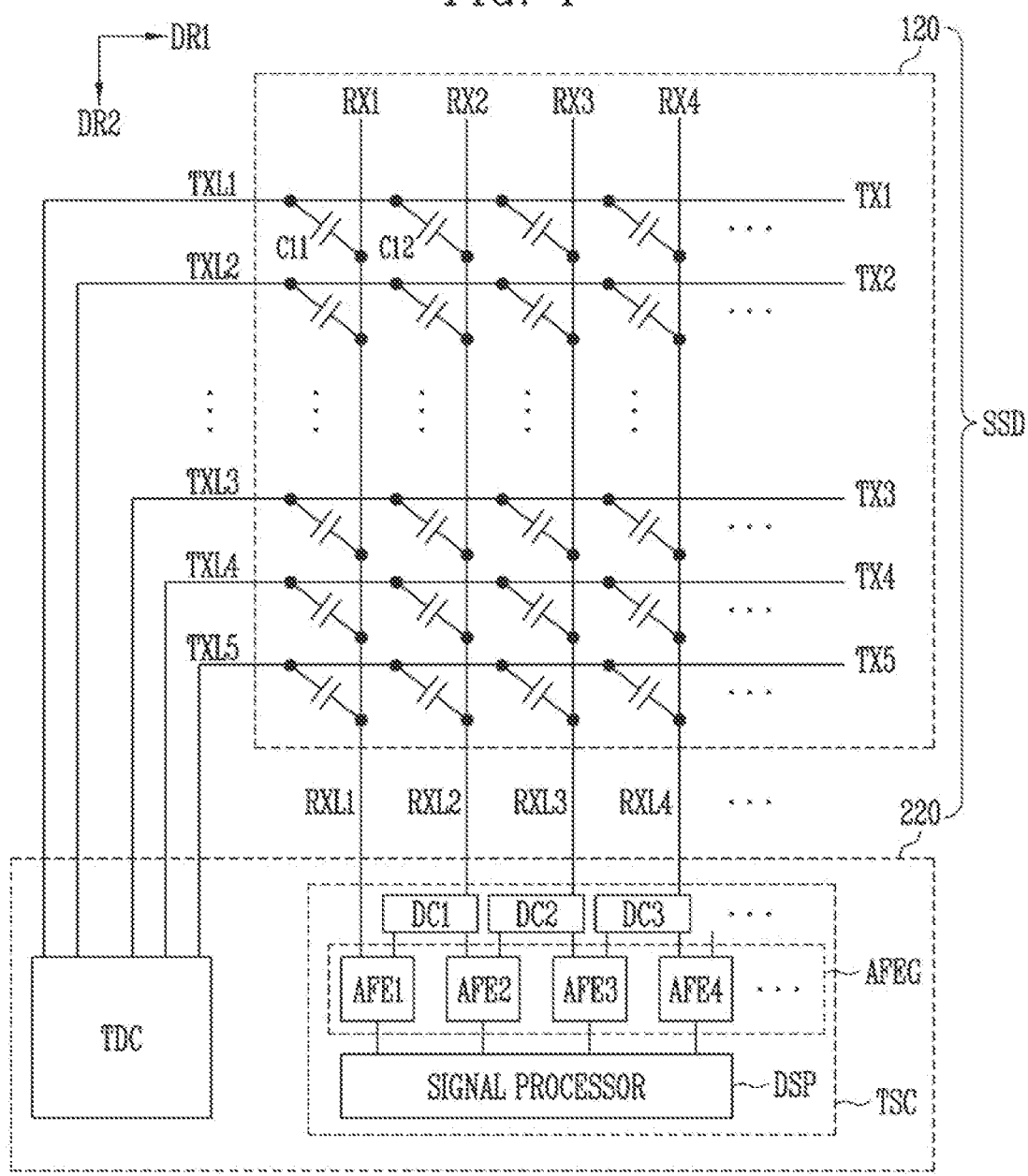
FIG. 4 is a diagram for describing a sensor device in accordance with an embodiment of the present disclosure.

FIG. 4 is a diagram for describing a sensor device SSD in accordance with an embodiment of the present disclosure.

Unlike the sensor receiver TSC of FIG. 3, the sensor receiver TSC of FIG. 4 may further include distribution circuits DC1, DC2, and DC3.

The distribution circuits DC1, DC2, and DC3 may be disposed between at least some of the second sensors RX1 to RX4 and the analog front ends AFE1 to AFE4, generate a plurality of signals having the same magnitude (e.g., the same voltage level or the same amount of current) based on respective sensing signals provided from at least some of the second sensors RX1 to RX4, and distribute the generated signals to the analog front ends AFE1 to AFE4. For example, the distribution circuits DC1, DC2, and DC3 may include amplifiers, buffers, and the like, may amplify or mirror each of the sensing signals, and may output the amplified or mirrored signals.

For example, the first distribution circuit DC1 may receive a second sensing signal from the second sensor RX2 and provide signals each having the same size as that of the second sensing signal to each of the first analog front end AFE1 and the second analog front end AFE2. For reference, in the case in which the second sensing signal does not flow through the first distribution circuit DC1, the second sensing signal may be simultaneously supplied to the first analog front end AFE1 and to the second analog front end AFE2. Hence, due to the relative increase in the load on the second sensing signal, the magnitude of the second sensing signal may be different from that of the first sensing signal received from the second sensor RX1. For example, the second sensing signal may be less than the first sensing signal. Therefore, in the present embodiment, signals having the same magnitude as that of the second sensing signal may be respectively provided to the first analog front end AFE1 and the second analog front end AFE2 by using the first distribution circuit DC1.

Likewise, the second distribution circuit DC2 may receive a third sensing signal provided from the second sensor RX3, and may provide signals each having the same magnitude as that of the third sensing signal to each of the second analog front end AFE2 and the third analog front end AFE3. The third distribution circuit DC3 may receive a fourth sensing signal provided from the second sensor RX4, and may provide signals each having the same magnitude as that of the fourth sensing signal to each of the third analog front end AFE3 and the fourth analog front end AFE4.

Figure 5:
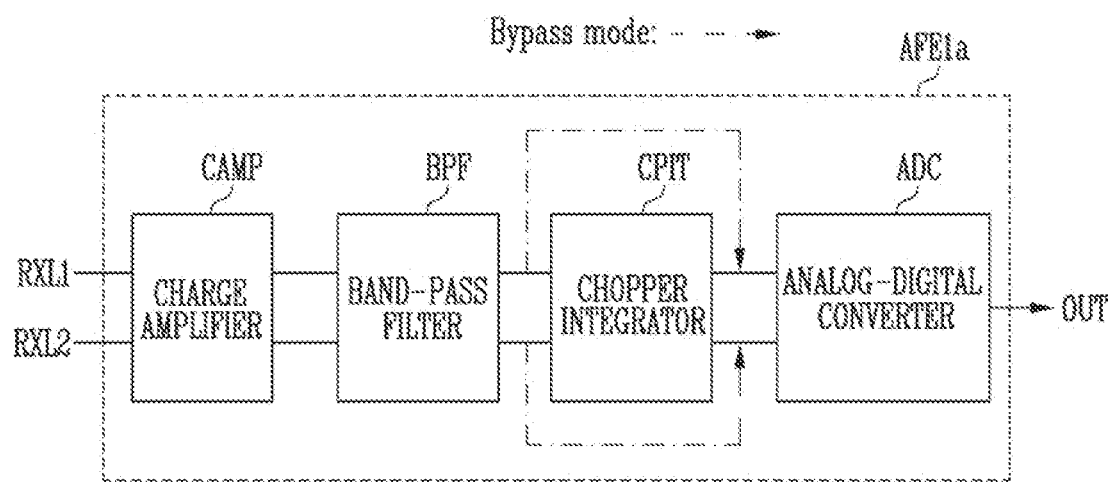
FIG. 5 is a diagram for describing an analog front end in accordance with an embodiment of the present disclosure.

FIG. 5 is a diagram for describing an analog front end in accordance with an embodiment of the present disclosure.

Referring to FIG. 5, a first analog front end AFE1a in accordance with an embodiment of the present disclosure may include a charge amplifier CAMP, a band-pass filter BPF, a chopper integrator CPIT, and an analog-digital converter ADC. The other analog front ends AFE2, AFE3, and AFE4 may have the same configuration as the first analog front end AFE1a, other than the difference in the second sensors connected thereto; therefore, redundant description thereof will be omitted (refer to FIGS. 3 and 4).

The charge amplifier CAMP may receive sensing signals from two sensors (e.g., RX1 and RX2) among the second sensors RX1 to RX4 via the second sensor lines RXL1 and RXL2. For example, the charge amplifier CAMP may be a fully differential amplifier, and may output a signal corresponding to the difference between the level of the sensing signal from the second sensor RX2 and the level of the sensing signal from the second sensor RX1, and an inverted signal thereof. For example, the charge amplifier CAMP may include a first input terminal (e.g., a non-Inverting terminal), connected to the second sensor line RXL2, and a second input terminal (e.g., an inverting terminal), connected to the second sensor line RXL1. Therefore, the charge amplifier CAMP may output a signal corresponding to the difference between the level of a sensing signal from the second sensor RX2 and the level of a sensing signal from the second sensor RX1. FIG. 5 illustrates that two internal signal lines are provided parallel to each other on the assumption that the components, e.g., the band-pass filter BPF, the chopper integrator CPIT, and analog-digital converter ADC connected to an output terminal of the charge amplifier CAMP have specifications such that both an input signal and an inverted input signal are needed. Each of the components, e.g., the band-pass filter BPF, the chopper integrator CPIT, and the analog-digital convertor ADC can remove common-mode noise by using the input signal and the inverted input signal.

However, in an embodiment, each of the components, e.g., the band-pass filter BPF, the chopper integrator CPIT, and the analog-digital converter ADC may have specifications such that only the input signal is needed, without needing the inverted input signal. Here, the output terminal of the charge amplifier CAMP may have a single-ended structure that outputs only a signal corresponding to the difference between the level of a sensing signal from the second sensor RX2 and the level of a sensing signal from the second sensor RX1. In the foregoing embodiment, only a single internal signal line for connecting the charge amplifier CAMP and the respective components, e.g., the band-pass filter BPF, the chopper integrator CPIT, and the analog-digital converter ADC may be illustrated.

The band-pass filter BPF may be connected to the output terminal of the charge amplifier CAMP. The band-pass filter BPF may filter sensing signals (or a difference signal representing the difference between the sensing signals and an inverted signal thereof). The band-pass filter BPF may filter an output signal of the charge amplifier CAMP so that the output signal occupies a set frequency band. In other words, the band-pass filter BPF may filter an output signal of the charge amplifier CAMP so that the output signal is inside a set frequency band. For example, the frequency band may be preset to include a frequency (or a center frequency) of the sensing signals. Noise components may be located outside the frequency band. The center frequency of the sensing signals may be the same as that of driving signals. For example, if a frequency of the driving signals is a first frequency, a center frequency of the band-pass filter BPF may be set to the first frequency.

The chopper integrator CPIT may be connected to the output terminal of the band-pass filter BPF. The center frequency of the chopper integrator CPIT may be set to the first frequency. In other words, the frequency of the driving signals, the center frequency of the band-pass filter BPF, and the center frequency of the chopper integrator CPIT may be set to the same value. Therefore, even if the number of integrations of the chopper integrator CPIT cannot increase because a limited sensing time is allocated to the first analog front end AFE1a, a signal-to-noise ratio (SNR) may be increased by the band-pass filter BPF, so that the accuracy of touch detection may be enhanced.

The analog-digital converter ADC may convert an output signal of the chopper integrator CPIT to a digital signal OUT. The analog-digital converter ADC may be embodied as a conventional analog-digital converter such as a successive-approximation-register analog-to-digital converter (SAR ADC).

The signal processor DSP may use digital signals OUT outputted from the respective analog front ends AFE1, AFE2, AFE3, and AFE4 and determine final sensing values (refer to FIG. 3 and Equation 1 to Equation 3).

However, in the case in which the sensor receiver is operated in a bypass mode, the function of the chopper integrator CPIT may be performed in a digital scheme in the signal processor DSP. In this case, the output of the band-pass filter BPF may be directly transmitted as input to the analog-digital converter ADC. In other words, the chopper integrator CPIT may be bypassed as shown by the dashed arrows in FIG. 5.

An embodiment of the present disclosure provides a sensor device including: first sensors TX1 to TX5; second sensors RX1 to RX4 configured to form capacitances C11, C12 with the first sensors TX1 to TX5; a sensor transmitter TDC connected to the first sensors TX1 to TX5 and configured to supply driving signals having a first frequency to the first sensors TX1 to TX5; and a sensor receiver TSC connected to the second sensors RX1 to RX4 and configured to receive sensing signals from the second sensors RX1 to RX4, wherein the sensor receiver TSC includes: a multipath filter, e.g., the band-pass filter BPF, having a center frequency set to the first frequency; and a first chopper integrator, e.g., the chopper integrator CPIT, connected to the multipath filter, and having a center frequency set to the first frequency.

Figure 6:
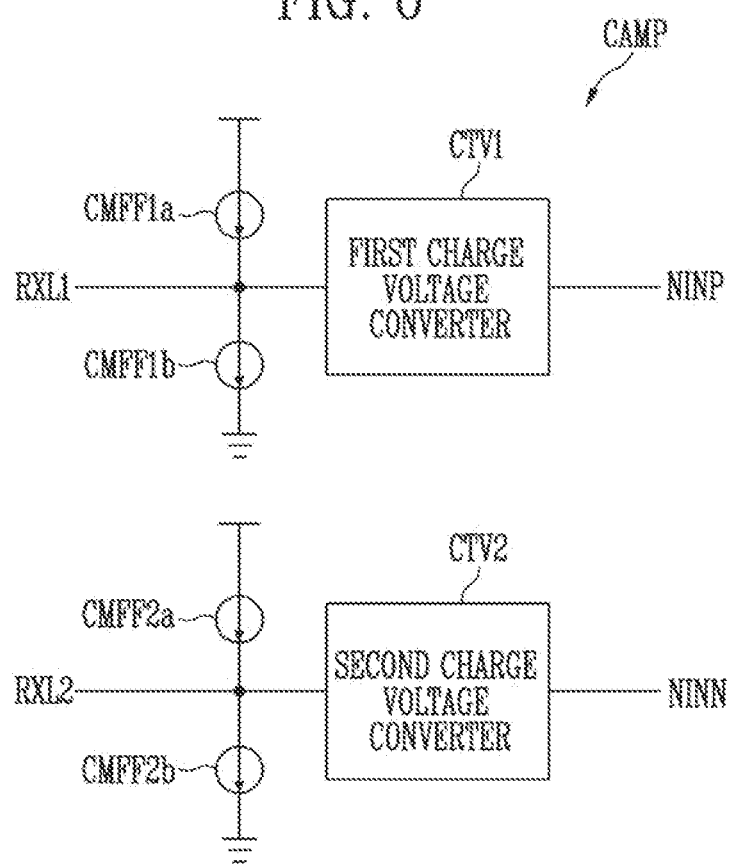
FIG. 6 is a diagram for describing a charge amplifier in accordance with an embodiment of the present disclosure.

FIG. 6 is a diagram for describing the charge amplifier CAMP in accordance with an embodiment of the present disclosure.

For example, the charge amplifier CAMP may include a first charge voltage converter CTV1, a second charge voltage converter CTV2, and current sources CMFF1a, CMFF1b, CMFF2a, and CMFF2b.

The first charge voltage converter CTV1 may convert charges received from the second sensor line RXL1 to a voltage signal. Here, the current sources CMFF1a and CMFF1b may source or sink current to maintain a common-mode voltage. Each of the current sources CMFF1a and CMFF1b may be formed of a known circuit, such as a charge domain common-mode feed-forward (CD CMFF) circuit. A voltage signal generated from the first charge voltage converter CTV1 may be used as a first input signal NINP of the band-pass filter BPF.

The second charge voltage converter CTV2 may convert charges received from the second sensor line RXL2 to a voltage signal. Here, the current sources CMFF2a and CMFF2b may source or sink current to maintain a common-mode voltage. Each of the current sources CMFF2a and CMFF2b may be formed of a known circuit, such as a CD CMFF circuit. A voltage signal generated from the second charge voltage converter CTV2 may be used as a second input signal NINN of the band-pass filter BPF.

FIGS. 7 to 13 are diagrams for describing a band-pass filter BPFa in accordance with an embodiment of the present disclosure.

Figure 7:
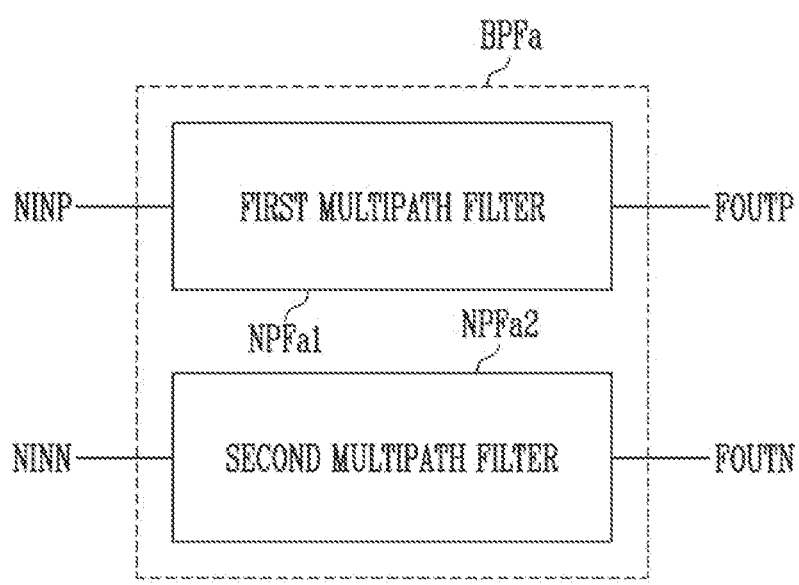
FIGS. 7, 8, 9, 10, 11, 12 and 13 are diagrams for describing a band-pass filter in accordance with an embodiment of the present disclosure.

Referring to FIG. 7, the band-pass filter BPFa may include a first multipath filter NPFa1 and a second multipath filter NPFa2. The first multipath filter NPFa1 may filter the first input signal NINP and generate a first output signal FOUTP. The second multipath filter NPFa2 may filter the second input signal NINN and generate a second output signal FOUTN. Here, the first multipath filter NPFa1 and the second multipath filter NPFa2 may be operated independently of each other.

Figure 8:
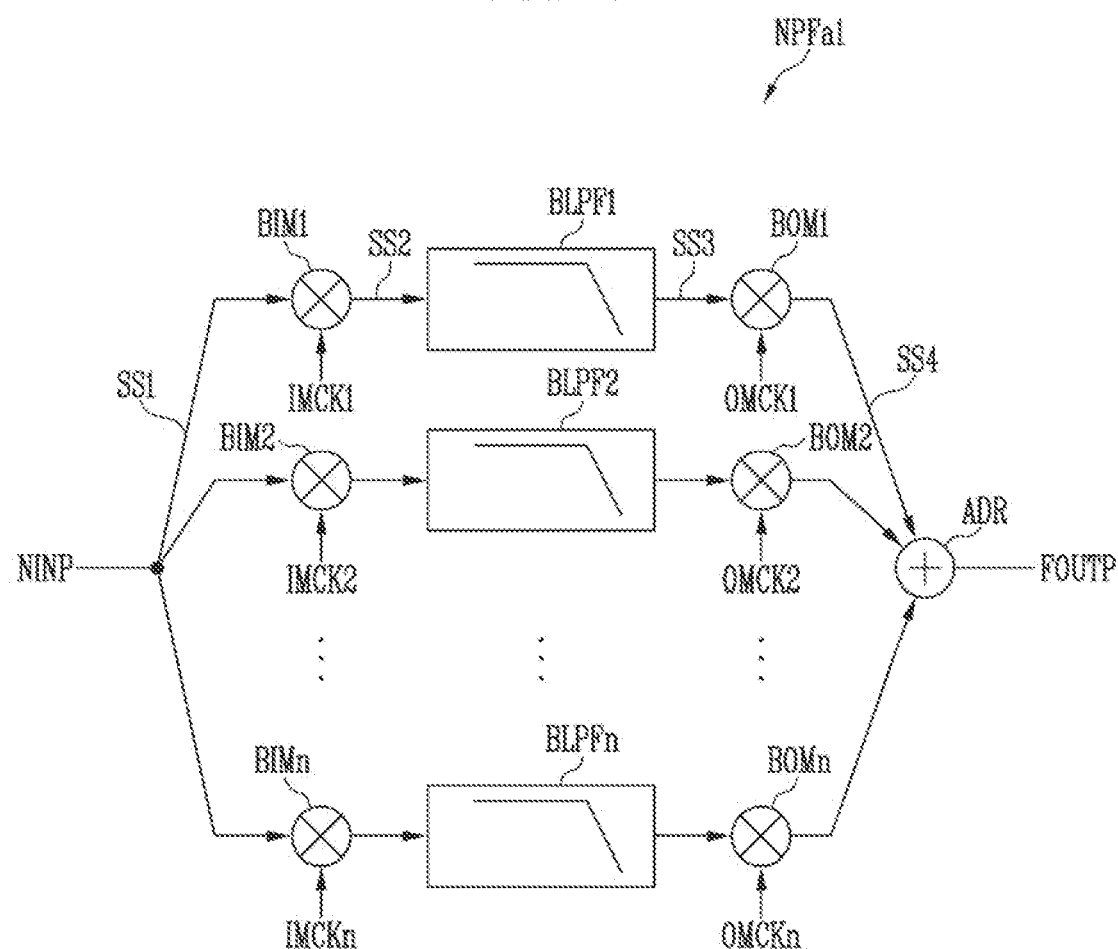

Referring to FIG. 8, there is illustrated the configuration of the first multipath filter NPFa1. The second multipath filter NPFa2 may have the same configuration as the first multipath filter NPFa1; therefore, a redundant explanation thereof will be omitted.

Referring to FIG. 8, the first multipath filter NPFa1 in accordance with an embodiment of the present disclosure may include a plurality of paths connected in parallel to each other between an input terminal and output terminal. The plurality of paths may receive identical input signals SS1. Each of the input signals SS1 may be a signal having the same voltage level as that of the first input signal NINP. In other words, each of the paths may receive the first input signal NINP. Output signals SS4 of the plurality of paths may be added (or summed) in an adder ADR. For example, the adder ADR may be an electrical node to which the output signals SS4 of the plurality of paths are applied in common, rather than being a particular element.

The first path may successively include a first input mixer BIM1, a first filter BLPF1, and a first output mixer BOM1. The second path may successively include a second input mixer BIM2, a second filter BLPF2, and a second output mixer BOM2. An n-th path may successively include an n-th input mixer BIMn, an n-th filter BLPFn, and an n-th output mixer BOMn.

In FIG. 8, it is assumed that n paths are provided as the plurality of paths. Here, n is an integer greater than 0. As n increases, the degree to which a target signal is amplified may be increased (e.g., a Q-factor increases). However, if the number of paths increases excessively, harmonic components may also be amplified. Therefore, n is to be set to an appropriate number. According to an experiment, it is appropriate for n to be four or eight.

The frequency and phase of a first input clock signal IMCK1 received by the first input mixer BIM1 may be the same as those of a first output clock signal OMCK1 received by the first output mixer BOM1. The frequency and phase of a second input clock signal IMCK2 received by the second input mixer BIM2 may be the same as those of a second output clock signal OMCK2 received by the second output mixer BOM2. The frequency and phase of an n-th input clock signal IMCKn received by the n-th input mixer BIMn may be the same as those of an n-th output clock signal OMCKn received by the n-th output mixer BOMn.

Figure 9:
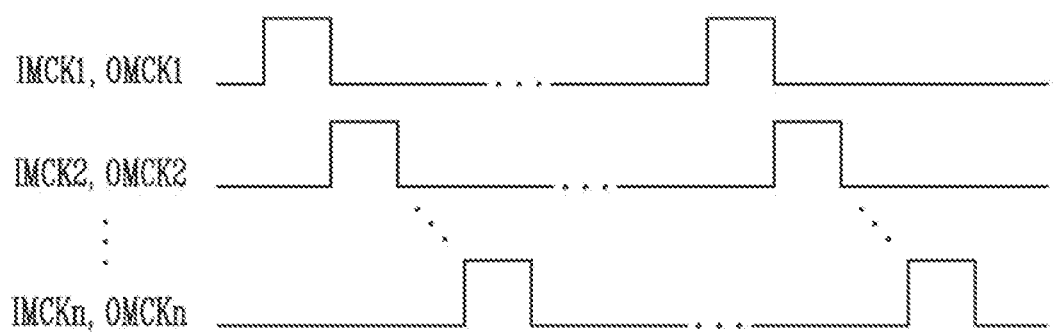

Referring to FIG. 9, the frequencies of the input clock signals IMCK1, IMCK2, . . . IMCKn may be the same as each other. The phases of the input clock signals IMCK1, IMCK2, . . . IMCKn may differ from each other. For example, the frequency of the first input clock signal IMCK1 may be the same as that of the second input clock signal IMCK2. The phase of the first input clock signal IMCK1 may differ from that of the second input clock signal IMCK2. For example, a high level of the first input clock signal IMCK1 and the first output clock signal OMCK1 may occur at a different time than a high level of the second input clock signal IMCK2 and the second output clock signal OMCK2. Consequently, frequency components at different time points are summed in the adder ADR, so the dependency/sensitivity on a specific time point may be reduced.

Figure 10:
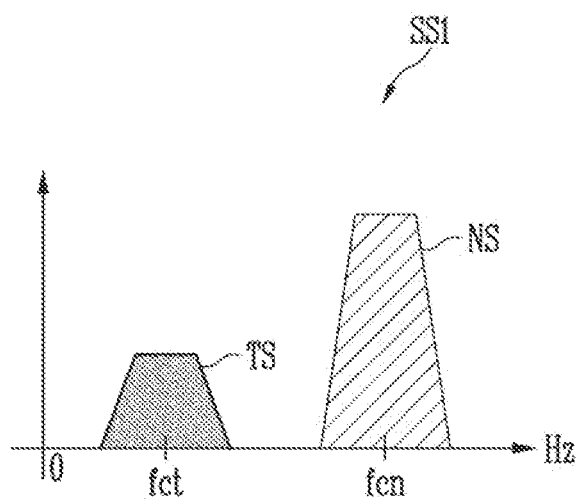

Referring to FIG. 10, there are illustrated frequency components TS and NS of an input signal SS1. In the graph, a horizontal axis indicates a frequency in Hz, and a vertical axis indicates a signal magnitude. It is assumed that the frequency component TS is a frequency component that includes valid information and has a frequency fct of a driving signal as a center frequency. It is assumed that the frequency component NS is a noise component having an arbitrary frequency fcn as a center frequency.

Figure 11:
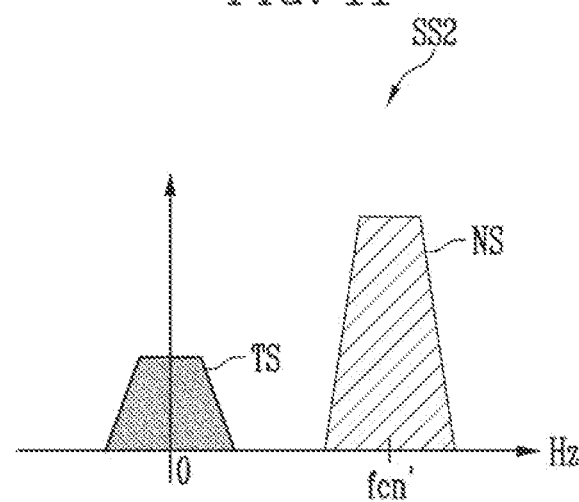

The first input mixer BIM1 may output frequency components respectively corresponding to the difference between and the sum of a frequency fct of the first input clock signal IMCK1 and a frequency of the input signal SS1 (e.g., the frequency of the driving signals). Referring to FIG. 11, an output signal SS2 of the first input mixer BIM1 is partially illustrated. For example, frequency components TS and NS corresponding to the difference between the frequency fct of the first input clock signal IMCK1 and the frequency of the input signal SS1 are illustrated.

The frequencies fct of the input clock signals IMCK1, IMCK2, . . . IMCKn may be the same as the frequency fct of the driving signals transmitted from the sensor transmitter TDC. For example, the frequency fct of the first input clock signal IMCK1 may be the same as the frequency fct of the driving signals. Therefore, the center frequency of the frequency component TS may be 0 Hz (0=fct−fct). The center frequency of the frequency component NS may be an arbitrary frequency (fcn'=fcn−fct), and may not be 0 Hz (refer to FIG. 11).

Figure 12:
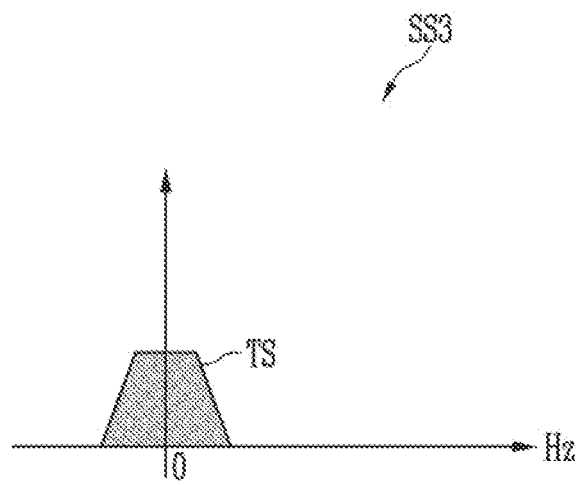

The center frequency of a pass band of the first filter BLPF1 may be set to the difference (e.g., 0 Hz) between or the sum (e.g., 2 fct) of the frequency fct of the first input clock signal IMCK1 and the frequency fct of the driving signals. Referring to FIG. 12, there is illustrated the case where the center frequency of the pass band of the first filter BLPF1 is set to the difference (e.g., 0 Hz) between the frequency fct of the first input clock signal IMCK1 and the frequency fct of the driving signals. In other words, the first filter BLPF1 may be set to a low-pass filter, the center frequency of which is 0 Hz. Therefore, an output signal SS3 of the first filter BLPF1 may include only the frequency component TS including valid information, without including the frequency component NS, which is a noise component. In other words, the first filter BLPF1 may remove the noise component from the output signal SS2.

Figure 13:
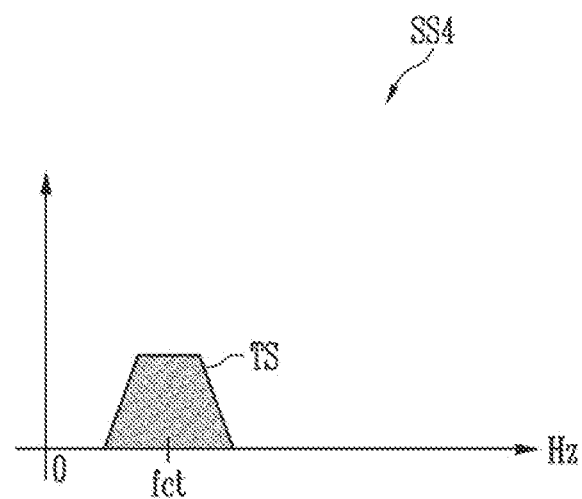

Referring to FIG. 13, the first output mixer BOM1 may output a frequency component corresponding to the difference (e.g., (−)fct) between and the sum (e.g., fct) of a frequency fct of the first output clock signal OMCK1 and a frequency (e.g., 0 Hz) of the input signal SS3. For example, the frequency fct of the first output clock signal OMCK1 may be the same as the frequency fct of the first input clock signal IMCK1. As described above, the center frequency of the frequency component TS of the input signal SS3 may be 0 Hz. Therefore, the frequency component TS having, as the center frequency, a frequency fct corresponding to the sum of the frequency fct of the first output clock signal OMCK1 and the frequency (0 Hz) of the input signal SS3 may be outputted.

Referring to FIGS. 10 to 13, it can be seen that the valid frequency component TS passes without a change in center frequency and that the invalid frequency component NS is removed. In other words, the first path may be operated as a band-pass filter having the frequency fct as the center frequency. Each of the other paths (e.g., the paths from the second input mixer BIM2 to the second output mixer BOM2, and so forth) may be operated as a band-pass filter having the frequency fct as the center frequency, and thus, a redundant explanation thereof will be omitted.

In the present embodiment, the band-pass filter BPF may be embodied without using an operational amplifier (OP-AMP). Hence, the size and power consumption of the band-pass filter BPF may be reduced. Furthermore, there is an advantage in that, since the frequencies of the clock signals IMCK1, IMCK2, IMCKn, OMCK1, OMCK2, and OMCKn are set to the center frequency of the band-pass filter BPF, it is easy to set the center frequency of the band-pass filter BPF to the first frequency. For example, if the frequency of each of the clock signals IMCK1, IMCK2, IMCKn, OMCK1, OMCK2, and OMCKn is set to the first frequency, the center frequency of the band-pass filter BPF may be set to the first frequency.

Figure 14:
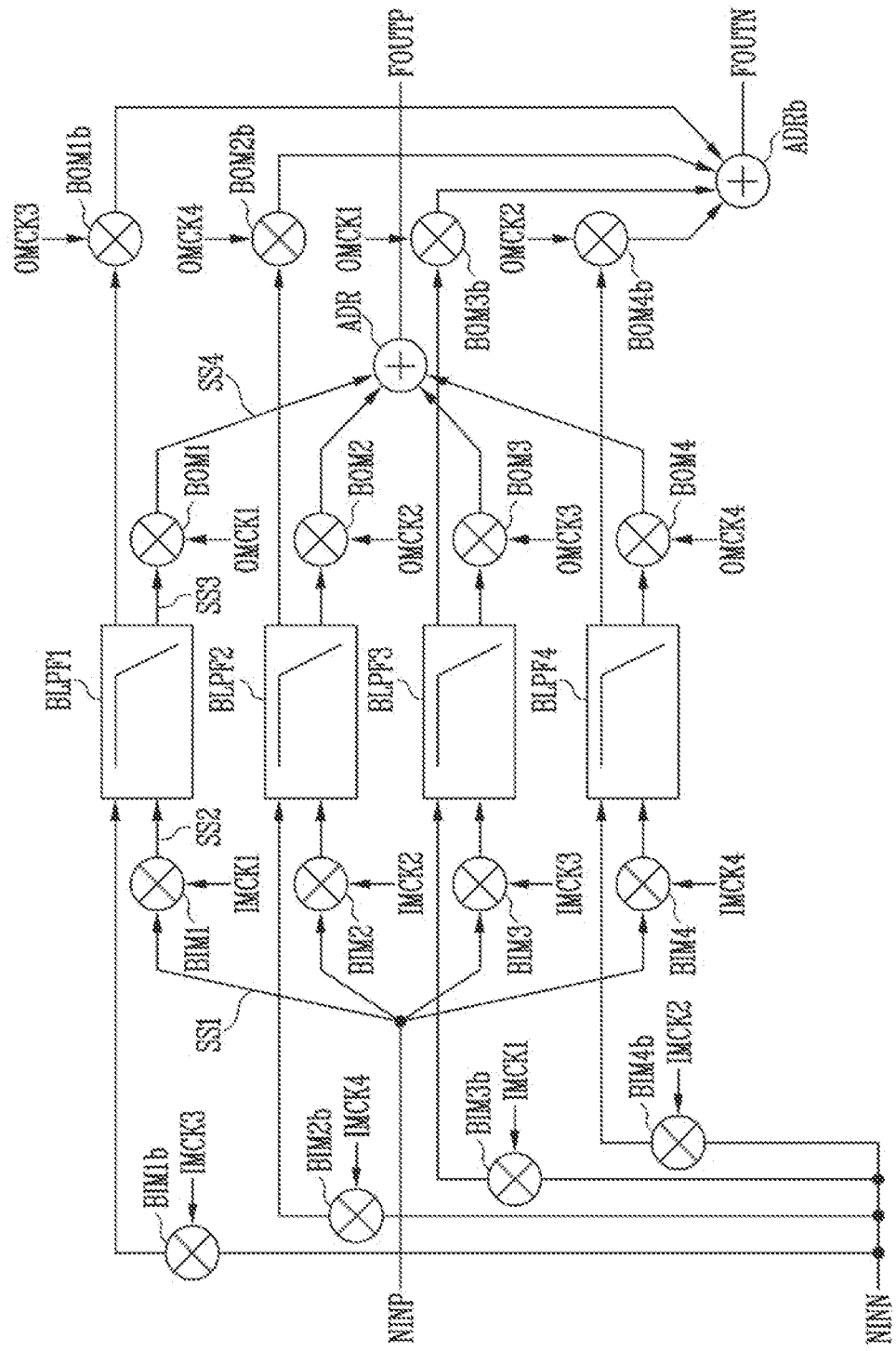
FIGS. 14 and 15 are diagrams for describing a band-pass filter in accordance with an embodiment of the present disclosure.
Figure 15:
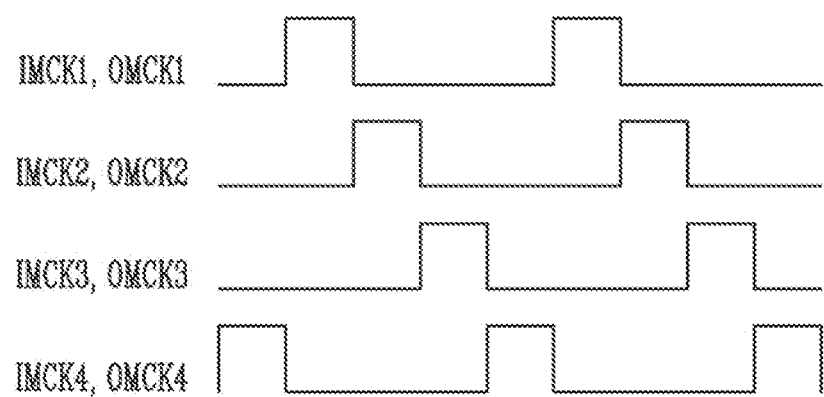

FIGS. 14 and 15 are diagrams for describing a band-pass filter BPFb in accordance with an embodiment of the present disclosure.

Referring to FIG. 14, the band-pass filter BPFb in accordance with an embodiment of the present disclosure may be a multipath filter, and include a plurality of first paths connected in parallel between a first input terminal and a first output terminal, and a plurality of second paths connected in parallel between a second input terminal and a second output terminal. The first input terminal may receive a first input signal NINP. The first output terminal may output a first output signal FOUTP. The second input terminal may receive a second input signal NINN. The second output terminal may output a second output signal FOUTN. Here, the first paths and the second paths may share filters BLPF1, BLPF2, BLPF3, and BLPF4. For the sake of explanation, there is illustrated the case where the first paths are embodied as four first paths, and the second paths are embodied as four second paths.

One of the first paths may successively include a first input mixer BIM1, a first filter BLPF1, and a first output mixer BOM1. One of the second paths may include a second input mixer BIM1*b* and a second output mixer BOM1*b*. Here, an output terminal of the second input mixer BIM1*b* may be connected to an input terminal of the first filter BLPF1. An input terminal of the second output mixer BOM1*b* may be connected to an output terminal of the first filter BLPF1. In other words, the first path and the second path, which correspond to each other, may share the first filter BLPF1.

Here, the frequency and phase of a first input clock signal IMCK1 received by the first input mixer BIM1 may be the same as those of a first output clock signal OMCK1 received by the first output mixer BOM1. Furthermore, the frequency and phase of a second input clock signal IMCK3 received by the second input mixer BIM1*b* may be the same as those of a second output clock signal OMCK3 received by the second output mixer BOM1*b*. The frequency of the first input clock signal IMCK1 may be the same as that of the second input clock signal IMCK3. The phase of the first input clock signal IMCK1 may differ from that of the second input clock signal IMCK3. For example, the second input clock signal IMCK3 may differ in phase by 180° from that of the first input clock signal IMCK1. Therefore, even if the first path and the second path share the first filter BLPF1, input/output signals of the first path and the second path may not interfere with each other.

Likewise, one of the first paths may successively include a first input mixer BIM2, a first filter BLPF2, and a first output mixer BOM2. One of the second paths may include a second input mixer BIM2*b* and a second output mixer BOM2*b*. Here, the first path and the second path may share the first filter BLPF2. The first input mixer BIM2 may receive a first input clock signal IMCK2. The first output mixer BOM2 may receive a first output clock signal OMCK2. The second input mixer BIM2*b* may receive a second input clock signal IMCK4. The second output mixer BOM2*b* may receive a second output clock signal OMCK4.

Likewise, one of the first paths may successively include a first input mixer BIM3, a first filter BLPF3, and a first output mixer BOM3. One of the second paths may include a second input mixer BIM3*b* and a second output mixer BOM3*b*. Here, the first path and the second path may share the first filter BLPF3. The first input mixer BIM3 may receive a first input clock signal IMCK3. The first output mixer BOM3 may receive a first output clock signal OMCK3. The second input mixer BIM3*b* may receive a second input clock signal IMCK1. The second output mixer BOM3*b* may receive a second output clock signal OMCK1.

Likewise, one of the first paths may successively include a first input mixer BIM4, a first filter BLPF4, and a first output mixer BOM4. One of the second paths may include a second input mixer BIM4*b* and a second output mixer BOM4*b*. Here, the first path and the second path may share the first filter BLPF4. The first input mixer BIM4 may receive a first input clock signal IMCK4. The first output mixer BOM4 may receive a first output clock signal OMCK4. The second input mixer BIM4*b* may receive a second input clock signal IMCK2. The second output mixer BOM4*b* may receive a second output clock signal OMCK2.

Referring to FIG. 15, there is illustrated the input clock signals IMCK1 to IMCK4 and the output clock signals OMCK1 to OMCK4 in the case in which the first paths are formed of four first paths and the second paths are formed of four second paths. For example, the input clock signal IMCK2 (or the output clock signal OMCK2) may be delayed in phase by 90° from the input clock signal IMCK1 (or the output clock signal OMCK1). The input clock signal IMCK3 (or the output clock signal OMCK3) may be delayed in phase by 90° from the input clock signal IMCK2 (or the output clock signal OMCK2). The input clock signal IMCK4 (or the output clock signal OMCK4) may be delayed in phase by 90° from the input clock signal IMCK3 (or the output clock signal OMCK3). The frequencies of the input clock signals IMCK1 to IMCK4 and the output clock signals OMCK1 to OMCK4 may be the same as each other.

Signals outputted from the first output mixers BOM1 to BOM4 are summed in a first adder ADR, whereby a first output signal FOUTP may be generated. Signals outputted from the second output mixers BOM1*b* to BOM4*b* are summed in a second adder ADRb, whereby a second output signal FOUTN may be generated. The operations on the first paths and the second paths are the same as described with reference to FIGS. 9 to 13; therefore, redundant explanation thereof will be omitted.

Figure 16:
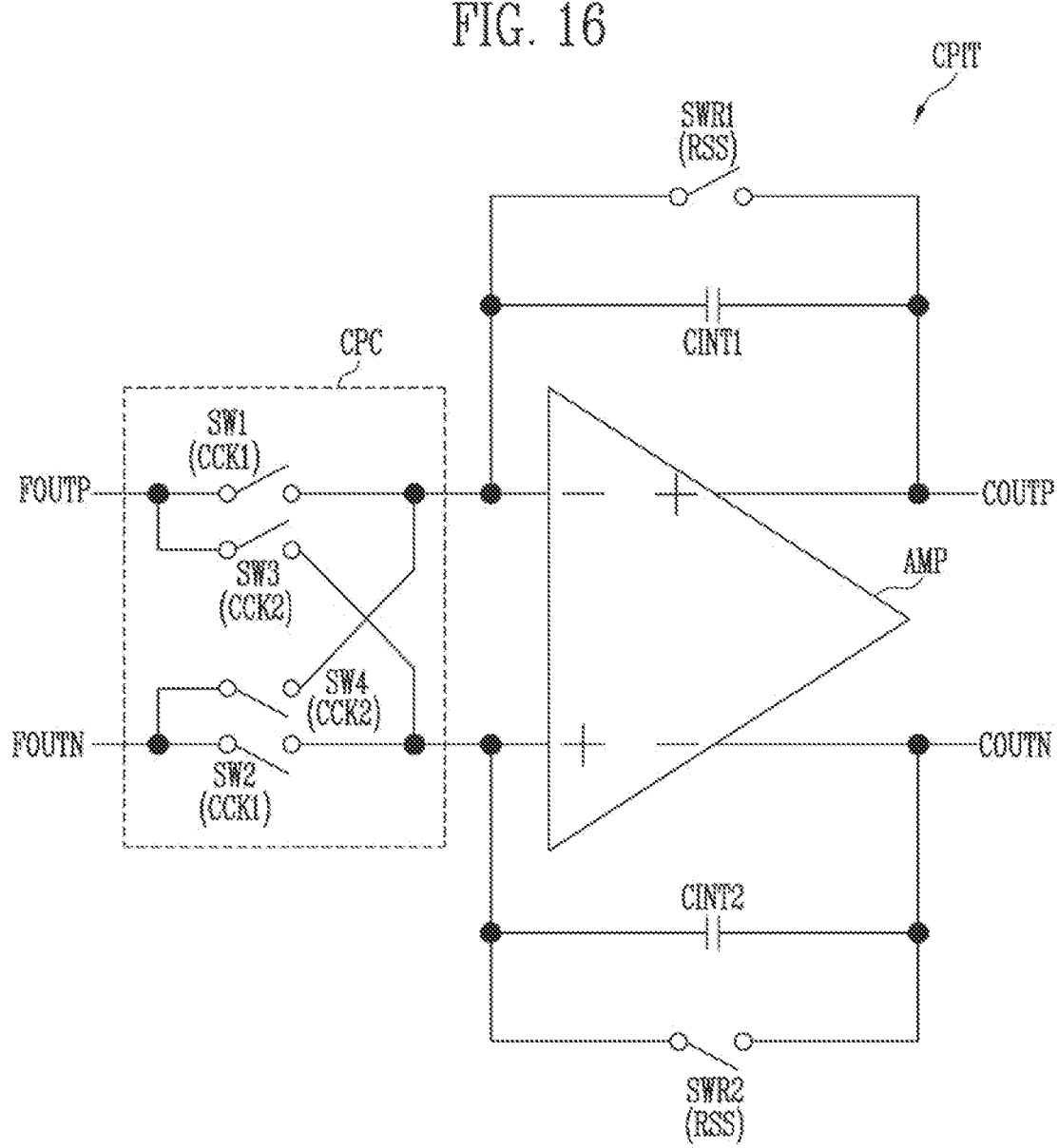
FIGS. 16 and 17 are diagrams for describing a chopper integrator in accordance with an embodiment of the present disclosure.
Figure 17:
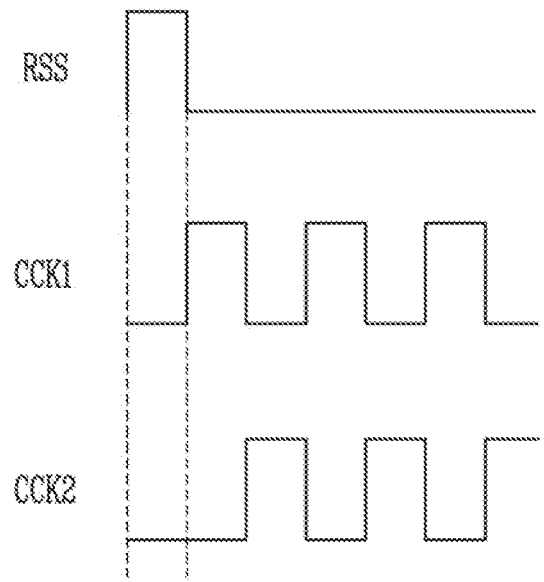

FIGS. 16 and 17 are diagrams for describing the chopper integrator CPIT in accordance with an embodiment of the present disclosure.

Referring to FIG. 16, the chopper integrator CPIT in accordance with an embodiment of the present disclosure may include a chopper circuit CPC, a first integration capacitor CINT1, a second integration capacitor CINT2, a first reset switch SWR1, a second reset switch SWR2, and an amplifier AMP. The amplifier AMP may be a fully differential amplifier. In an embodiment, in the case in which an output terminal of the amplifier AMP has a single-ended structure, the chopper integrator CPIT may not include the second integration capacitor CINT2 or the second reset switch SWR2.

The chopper circuit CPC may connect an input terminal of the amplifier AMP to an output terminal of the band-pass filter BPF. The chopper circuit CPC may include first to fourth switches SW1, SW2, SW3, and SW4. The first switch SW1 may connect a first output terminal of the band-pass filter BPF (from which a first output signal FOUTP may be outputted) and a first input terminal (e.g., an inverting terminal) of the amplifier AMP. The second switch SW2 may connect a second output terminal of the band-pass filter BPF (from which a second output signal FOUTN may be outputted) to a second input terminal (e.g., a non-inverting terminal) of the amplifier AMP. The third switch SW3 may connect the first output terminal of the band-pass filter BPF to the second input terminal of the amplifier AMP. The fourth switch SW4 may connect the second output terminal of the band-pass filter BPF to the first input terminal of the amplifier AMP.

The first integration capacitor CINT1 may connect the first input terminal of the amplifier AMP to a first output terminal (e.g., a non-inverting output terminal) of the amplifier AMP. The first reset switch SWR1 may be connected in parallel to the first integration capacitor CINT1. The second integration capacitor CINT2 may connect the second input terminal of the amplifier AMP and a second output terminal (e.g., an inverting output terminal) of the amplifier AMP. The second reset switch SWR2 may be connected in parallel to the second integration capacitor CINT2.

Referring to FIG. 17, there is illustrated an operating timing diagram of the chopper integrator CPIT.

First, if a reset signal RSS having a turn-on level (e.g., a logic high level) is supplied, the first reset switch SWR1 and the second reset switch SWR2 may be turned on. Hence, charges stored in the first integration capacitor CINT1 and the second integration capacitor CINT2 are initialized.

Next, a first clock signal CCK1 having a turn-on level (e.g., a logic high level) and a second clock signal CCK2 having a turn-on level may be alternately supplied. The first clock signal CCK1 and the second clock signal CCK2 may have the same frequency. The first clock signal CCK1 and the second clock signal CCK2 may differ in phase from each other. For example, the first clock signal CCK1 and the second clock signal CCK2 may differ in phase by 180°.

The first switch SW1 and the second switch SW2 may be turned on based on the first clock signal CCK1. The third switch SW3 and the fourth switch SW4 may be turned on based on the second clock signal CCK2. The period during which the first switch SW1 and the second switch SW2 are turned on may not overlap a period during which the third switch SW3 and the fourth switch SW4 are turned on. Hence, the chopper circuit CPC may invert the polarity of a signal to be transmitted to the amplifier AMP, each half cycle of the clock signal CCK1 or CCK2.

In the present embodiment, there is an advantage in that, since the frequencies of the first clock signal CCK1 and the second clock signal CCK2 are set to the first frequency, it is easy to set the center frequency of the chopper integrator CPIT to the first frequency.

Figure 18:
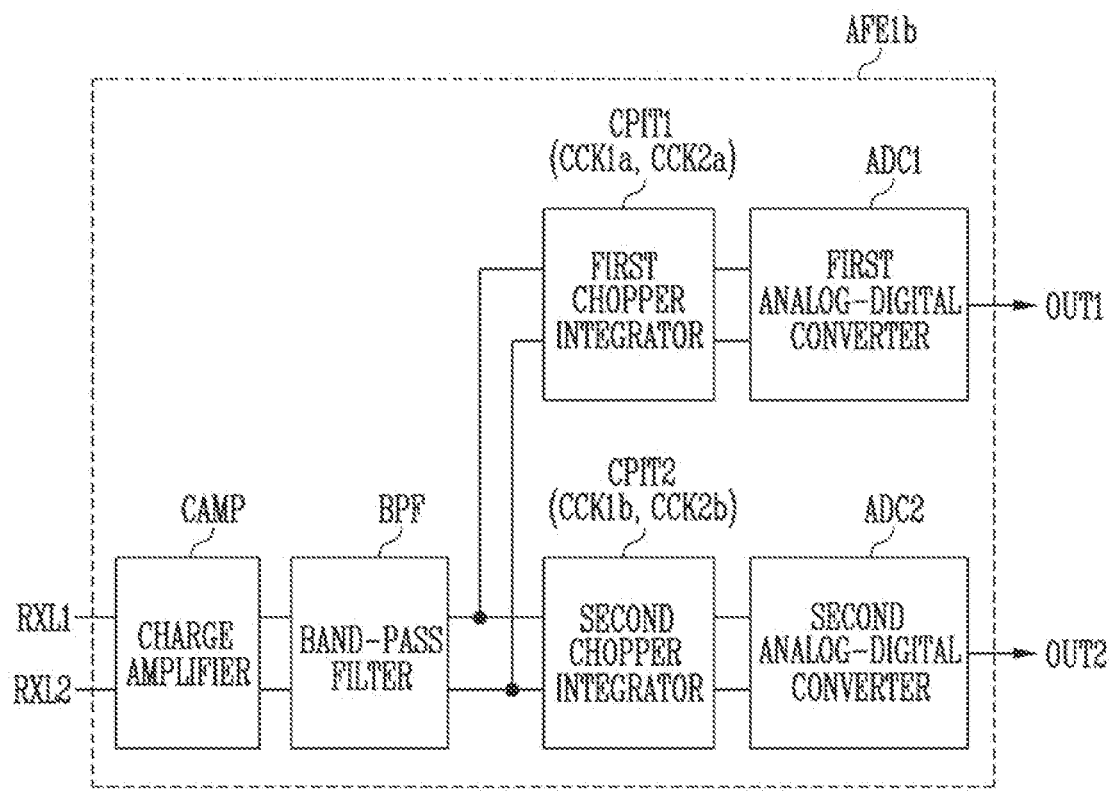
FIGS. 18 and 19 are diagrams for describing an analog front end in accordance with an embodiment of the present disclosure.
Figure 19:
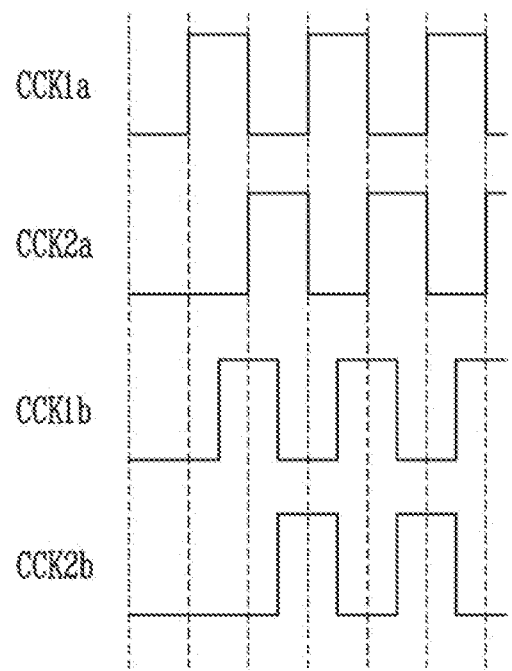

FIGS. 18 and 19 are diagrams for describing an analog front end AFE1$b$ in accordance with an embodiment of the present disclosure.

Referring to FIG. 18, the analog front end AFE1$b$ in accordance with an embodiment of the present disclosure may include a charge amplifier CAMP, a band-pass filter BPF, a first chopper integrator CPIT1, a first analog-digital converter ADC1, a second chopper integrator CPIT2, and a second analog-digital converter ADC2. Here, the charge amplifier CAMP and the band-pass filter BPF are the same as those of the first analog front end AFE1$a$ described with reference to FIG. 5; therefore redundant explanation thereof will be omitted.

The first chopper integrator CPIT1 may function as an in-phase demodulator (an I demodulator) based on clock signals CCK1$a$ and CCK2$a$. The second chopper integrator CPIT2 may function as a quadrature demodulator (a Q demodulator) based on clock signals CCK1$b$ and CCK2$b$. The frequencies of the clock signals CCK1$a$ and CCK2$a$ to be provided to the first chopper integrator CPIT1 may be the same as the frequencies of the clock signals CCK1$b$ and CCK2$b$ to be provided to the second chopper integrator CPIT2. For example, the center frequencies of the first chopper integrator CPIT1 and the second chopper integrator CPIT2 may be set to the first frequency. The clock signals CCK1$a$ and CCK2$a$ to be provided to the first chopper integrator CPIT1 may differ in phase from the clock signals CCK1$b$ and CCK2$b$ to be provided to the second chopper integrator CPIT2. For example, the clock signals CCK1$a$ and CCK2$a$ to be provided to the first chopper integrator CPIT1 may differ in phase by 90° from the clock signals CCK1$b$ and CCK2$b$ to be provided to the second chopper integrator CPIT2. For example, the clock signal CCK1$b$ may be delayed in phase by 90° from the clock signal CCK1$a$. Furthermore, the clock signal CCK2$b$ may be delayed in phase by 90° from the clock signal CCK2$a$.

The configuration of the first chopper integrator CPIT1 and the method of driving the first chopper integrator CPIT1 using the clock signals CCK1$a$ and CCK2$a$ may correspond to the configuration of the chopper integrator CPIT and the method of driving the chopper integrator CPIT using the clock signals CCK1 and CCK2 described with reference to FIGS. 16 and 17; therefore, redundant explanation thereof will be omitted. Likewise, the configuration of the second chopper integrator CPIT2 and the method of driving the second chopper integrator CPIT2 using the clock signals CCK1$b$ and CCK2$b$ may correspond to the configuration of the chopper integrator CPIT and the method of driving the chopper integrator CPIT using the clock signals CCK1 and CCK2, as described with reference to FIGS. 16 and 17; therefore, redundant explanation thereof will be omitted.

The first analog-digital converter ADC1 may convert an output signal of the first chopper integrator CPIT1 to a first digital signal OUT1. Likewise, the second analog-digital converter ADC2 may convert an output signal of the second chopper integrator CPIT2 to a second digital signal OUT2.

There may be a phase mismatch between the clock signals CCK1$a$, CCK2$a$, CCK1$b$, and CCK2$b$ and the output signal of the band-pass filter BPF. Since the phase mismatch may be caused by various factors such as a temperature change or a resistive-capacitive (RC) delay attributable to a difference in position between the first sensor TX and the second sensor RX, the degree to which the phase is mismatched may not be easily determined.

The signal processor DSP may decide a final sensing value based on the first digital signal OUT1 and the second digital signal OUT2. For example, the signal processor DSP may decide the final sensing value by adding the square of the first digital signal OUT1 and the square of the second digital signal OUT2 (refer to Equation 4).

$$(A\sin\theta)^2 + \left(A\sin\left(\frac{\pi}{2}+\theta\right)\right)^2 = (A\sin\theta)^2 + (A\cos\theta)^2 = A^2 \quad \text{[Equation 4]}$$

Here, A sin θ may correspond to an I-demodulated first digital signal OUT1, and $$A\sin\left(\frac{\pi}{2}+\theta\right)$$

may correspond to a Q-demodulated second digital signal OUT2. Referring to Equation 4, it can be seen that the original amplitude A is restored, regardless of the size of phase mismatch θ.

FIGS. 20 to 26 are diagrams for describing the configuration of a display device in accordance with an embodiment of the present disclosure. Reference numerals in FIGS. 20 to 26 are independent from reference numerals in FIGS. 1 to 19.

Figure 20:
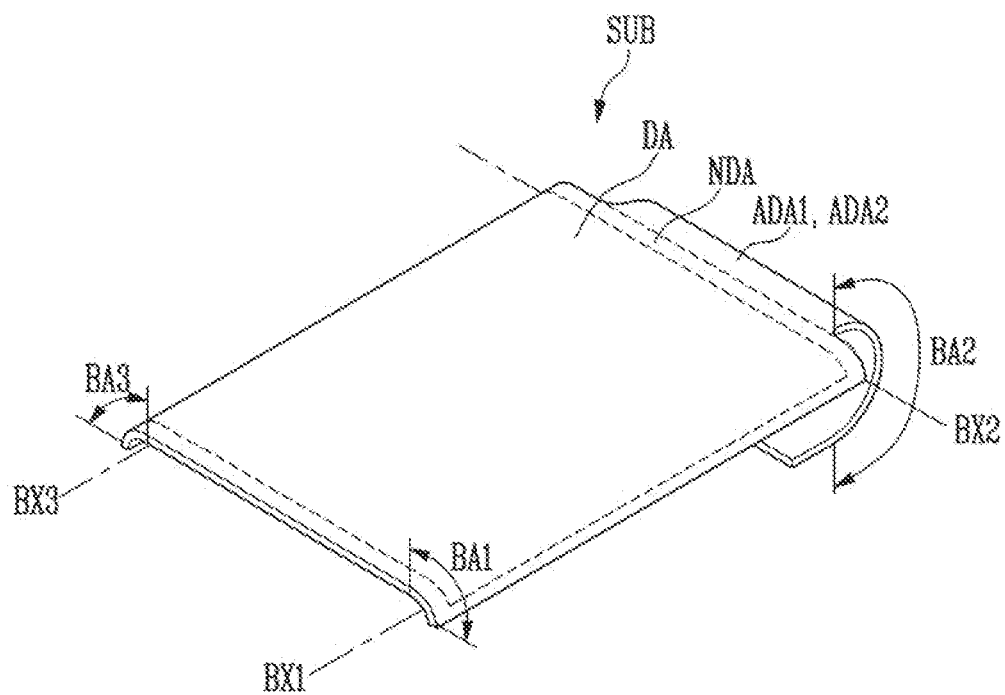
FIGS. 20, 21, 22, 23, 24, 25 and 26 are diagrams for describing the configuration of a display device in accordance with an embodiment of the present disclosure.
Figure 21:
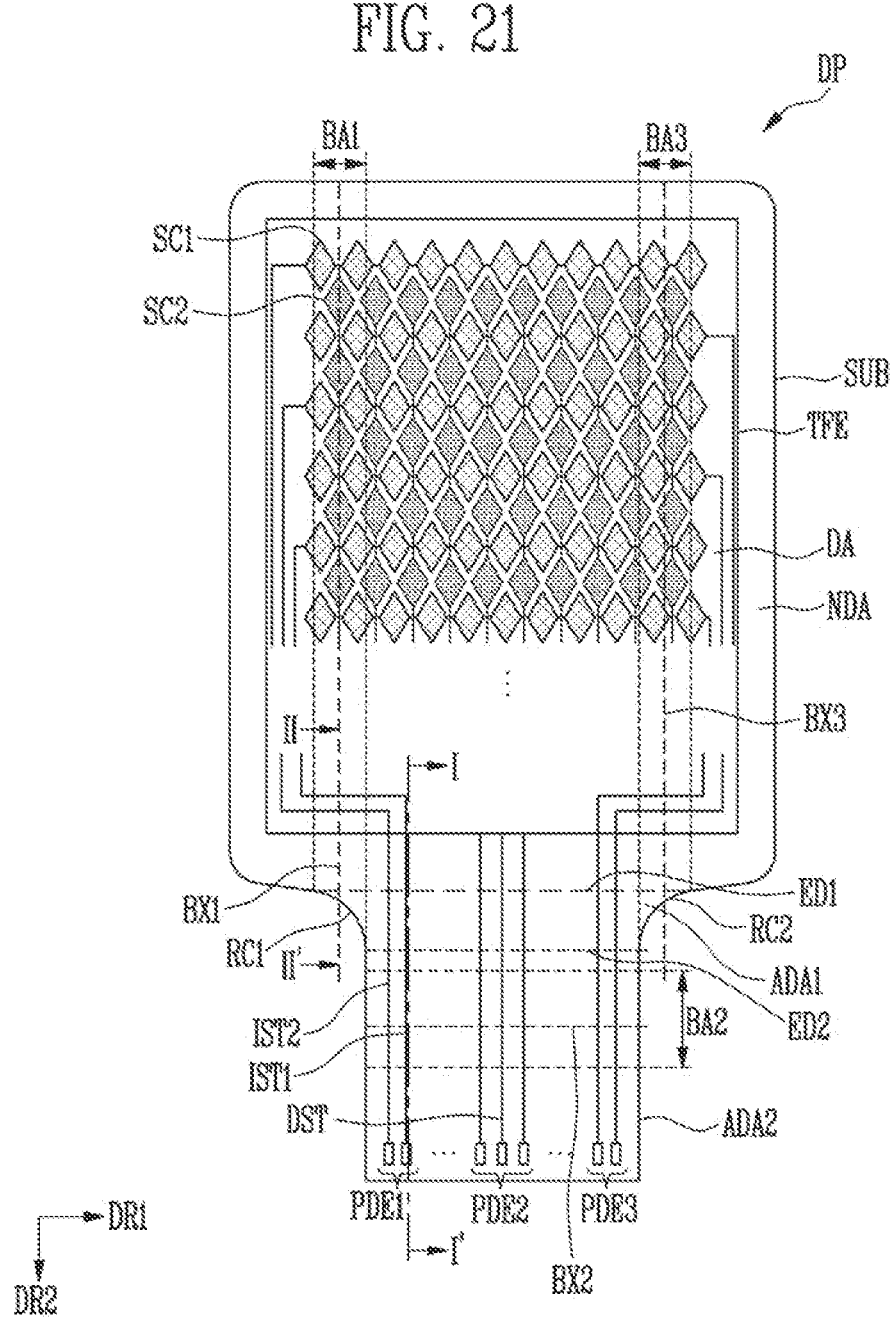

FIG. 20 is a diagram for describing a substrate in accordance with an embodiment of the present disclosure. FIG. 21 is a diagram for describing the display device in accordance with an embodiment of the present disclosure.

In the following embodiments, a plan view may be defined in a first direction DR1 and a second direction DR2, and the height may be defined in a third direction DR3 (refer to FIG. 22). The first direction DR1, the second direction DR2, and the third direction DR3 may be perpendicular to each other.

A substrate SUB may include a display area DA, a non-display area NDA, a first additional area ADA1, and a second additional area ADA2.

The display area DA may have a rectangular shape. Each corner of the display area DA may have an angled shape or a curved shape. In the case of a circular display, the display area DA may have a circular shape. Furthermore, the display area DA may have a polygonal shape, other than a rectangular shape, an elliptical shape, or the like. As such, the shape of the display area DA may vary depending on the product.

Pixels may be disposed in the display area DA. Depending on the type of display device DP, each of the pixels may include a light emitting diode or a liquid crystal layer.

The non-display area NDA may enclose the periphery of the display area DA. For example, the non-display area NDA may have a rectangular shape. Each corner of the non-display area NDA may have an angled shape or a curved shape. FIG. 21 illustrates the case where each corner of the non-display area NDA has a curved shape. The non-display area NDA may have a circular shape. Since minimizing the non-display area NDA is advantageous for forming a narrow bezel structure, the shape of the non-display area NDA may be similar to that of the display area DA.

The first additional area ADA1 may be disposed between the non-display area NDA and the second additional area ADA2. The first additional area ADA1 may be contiguous with the non-display area NDA along a first boundary ED1. The first boundary ED1 may be disposed along a short side of the non-display area NDA. The first additional area ADA1 may be contiguous with the second additional area ADA2 along a second boundary ED2. Each of the first boundary ED1 and the second boundary ED2 may extend in the first direction DR1.

The first additional area ADA1 may be reduced in width from the first boundary ED1 to the second boundary ED2. In other words, the width of the first additional area ADA1 with respect to the first direction DR1 may be reduced in the second direction DR2. Hence, the first additional area ADA1 may include a first side edge RC1 and a second side edge RC2, which are curved. The first and second side edges RC1 and RC2 may be convex toward the inside of the substrate SUB (e.g., the center of the substrate SUB).

FIG. 21 illustrates the first additional area ADA1 including two side edges RC1 and RC2 in the first direction DR1 and the direction opposite thereto. In an embodiment, the first additional area ADA1 may be made to include only the first side edge RC1 by matching the boundary of the first additional area ADA1 in the first direction DR1 to the boundary of the non-display area NDA. In an embodiment, the first additional area ADA1 may be made to include only the second side edge RC2 by matching the boundary of the first additional area ADA1 with respect to the direction opposite the first direction DR1 to the boundary of the non-display area NDA.

Figure 26:
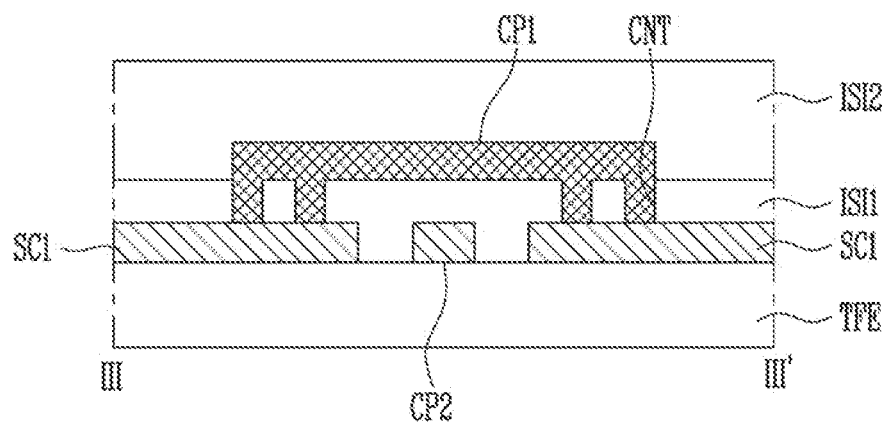

The second additional area ADA2 may have a rectangular shape. Each corner of the second additional area ADA2 may have an angled shape or a curved shape in the second direction DR2. FIG. 26 illustrates the case where each corner of the second additional area ADA2 has an angled shape in the second direction DR2.

An encapsulation layer TFE may be disposed on the pixels. For example, the encapsulation layer TFE may cover the pixels in the display area DA, and a boundary of the encapsulation layer TFE may be located in the non-display area NDA. The encapsulation layer TFE may cover emission elements of the pixels in the display area DA and circuit elements, thus preventing the emission elements and circuit elements from being damaged by external water or impacts.

Sensing electrodes SC1 and SC2 may be disposed on the encapsulation layer TFE. The sensing electrodes SC1 and SC2 may sense a touch, hover, gesture, proximity of the body of the user, or the like. The sensing electrodes SC1 and SC2 may be formed in various shapes depending on the manner of sensing, including a resistive type, a capacitive type, an electromagnetic type (EM), and an optical type. For example, in the case in which the sensing electrodes SC1 and SC2 form a capacitive-type sensing structure, the sensing electrodes SC1 and SC2 may form a self-capacitive-type sensing structure, a mutual-capacitive-type sensing structure, or the like. Hereinafter, for the sake of explanation, there will be described the case where the sensing electrodes SC1 and SC2 form a mutual-capacitive-type sensing structure.

In the case where the sensing electrodes SC1 and SC2 form a mutual-capacitive-type sensing structure, a driving signal may be transmitted through a sensing line corresponding to the first sensing electrode SC1, and a sensing signal may be received through a sensing line corresponding to the second sensing electrode SC2, which forms mutual capacitance with the first sensing electrode SC1. Mutual capacitance between the first sensing electrode SC1 and the second sensing electrode SC2 may vary when the body of the user is close thereto, so that a touch of the user can be detected by variation in the sensing signal resulting from the variation in mutual capacitance. In an embodiment, a driving signal is transmitted through the sensing line corresponding to the second sensing electrode SC2, and a sensing signal may be received through a sensing line corresponding to the first sensing electrode SC1, which forms mutual capacitance with the second sensing electrode SC2.

Pads PED1, PDE2, and PDE3 may be disposed in the second additional area ADA2. The pads PDE1 and PDE3 may be connected to the sensing electrodes SC1 and SC2 disposed over the encapsulation layer by sensing lines IST1 and IST2. The sensing lines IST1 and IST2 may extend from the second additional area ADA2 to the sensing electrodes SC1 and SC2 in the display area DA. The pads PDE1 and PDE3 may be connected to an external touch integrated chip (IC). Furthermore, the pads PDE2 may be connected to the pixels disposed under the encapsulation layer TFE or a driver for the pixels by display lines DST. The driver may include a scan driver, an emission driver, a data driver, and the like. The driver may be disposed under the encapsulation layer TFE, or may be disposed in an external display IC connected through the pads PDE2.

In the case in which the display device DP is a mutual-capacitance-type display device, a touch IC may transmit a driving signal through the first sensing line IST1, and may receive a sensing signal through the second sensing line IST2. In an embodiment, a driving signal may be transmitted through the second sensing line IST2, and a sensing signal may be received through the first sensing line IST1. For reference, in the case in which the display device DP is a self-capacitance-type display device, there may be no difference in the method of driving the first sensing line IST1 and the second sensing line IST2. The display lines DST may include a control line, a data line, a power line, and the like, and may provide signals to allow the pixels to display an image. Such signals may be provided from the driver, which is connected to the display lines DL.

FIG. 20 illustrates a substrate SUB in a bent state. FIG. 21 illustrates a substrate SUB that is not in the bent state. The display device DP may be bent, as illustrated in FIG. 20, after elements are stacked on the substrate SUB while the substrate SUB is not in the bent state, as illustrated in FIG. 21.

The substrate SUB may include a first bending area BA1 that extends from the first side edge RC1 of the first additional area ADA1 to overlap the non-display area NDA. In addition, the first bending area BA1 may extend to overlap the display area DA. In other words, each of the display area DA, the non-display area NDA, and the first additional area ADA1 may partially overlap the first bending area BAL. The first bending area BA1 may have a predetermined width in the first direction DR1, and the length of the first bending area BA1 may extend in the second direction DR2. A first bending axis BX1 may be defined as a folding line extending in the second direction DR2 in the center of the first bending area BA1. In an embodiment, the first bending area BA1 may be a portion that is reduced in stress by removing some insulating layers, unlike other peripheral portions. In an embodiment, the first bending area BA1 may have the same configuration as the other peripheral portions.

The substrate SUB may include a third bending area BA3, which extends from the second side edge RC2 of the first additional area ADA1 to overlap the non-display area NDA. In addition, the third bending area BA3 may extend to overlap the display area DA. In other words, each of the display area DA, the non-display area NDA, and the first additional area ADA1 may partially overlap the third bending area BA3. The third bending area BA3 may have a predetermined width in the first direction DR1, and the length of the third bending area BA3 may extend in the second direction DR2. A third bending axis BX3 may be defined as a folding line extending in the second direction DR2 in the center of the third bending area BA3. In an embodiment, the third bending area BA3 may be a portion that is reduced in stress by removing some insulating layers, unlike other peripheral portions. In an embodiment, the third bending area BA3 may have the same configuration as the other peripheral portions.

The second additional area ADA2 may include a second bending area BA2. The second bending area BA2 may have a predetermined width in the second direction DR1, and the length of the second bending area BA2 may extend in the first direction DR1. A second bending axis BX2 may be defined as a folding line extending in the first direction DR1 in the center of the second bending area BA2. In an embodiment, the second bending area BA2 may be a portion that is reduced in stress by removing some insulating layers, unlike other peripheral portions. In an embodiment, the second bending area BA2 may have the same configuration as the other peripheral portions.

The first to third bending areas BA1, BA2, and BA3 may not overlap each other.

Here, the term "fold" refers to the fact that the display device DP may be changed from its original shape to other shapes, rather than being fixed in shape, and encompasses meanings including being "folded" or "curved" along one or more bending axes or "rolled" In the manner of a scroll. Due to the first and third bending areas BA1 and BA3, side bezel widths with respect to the first direction DR1 of the display device DP and the direction opposite the first direction DR1 may be reduced. Furthermore, due to the second bending area BA2, a side bezel width in the second direction DR2 of the display device DP may be reduced.

Figure 22:
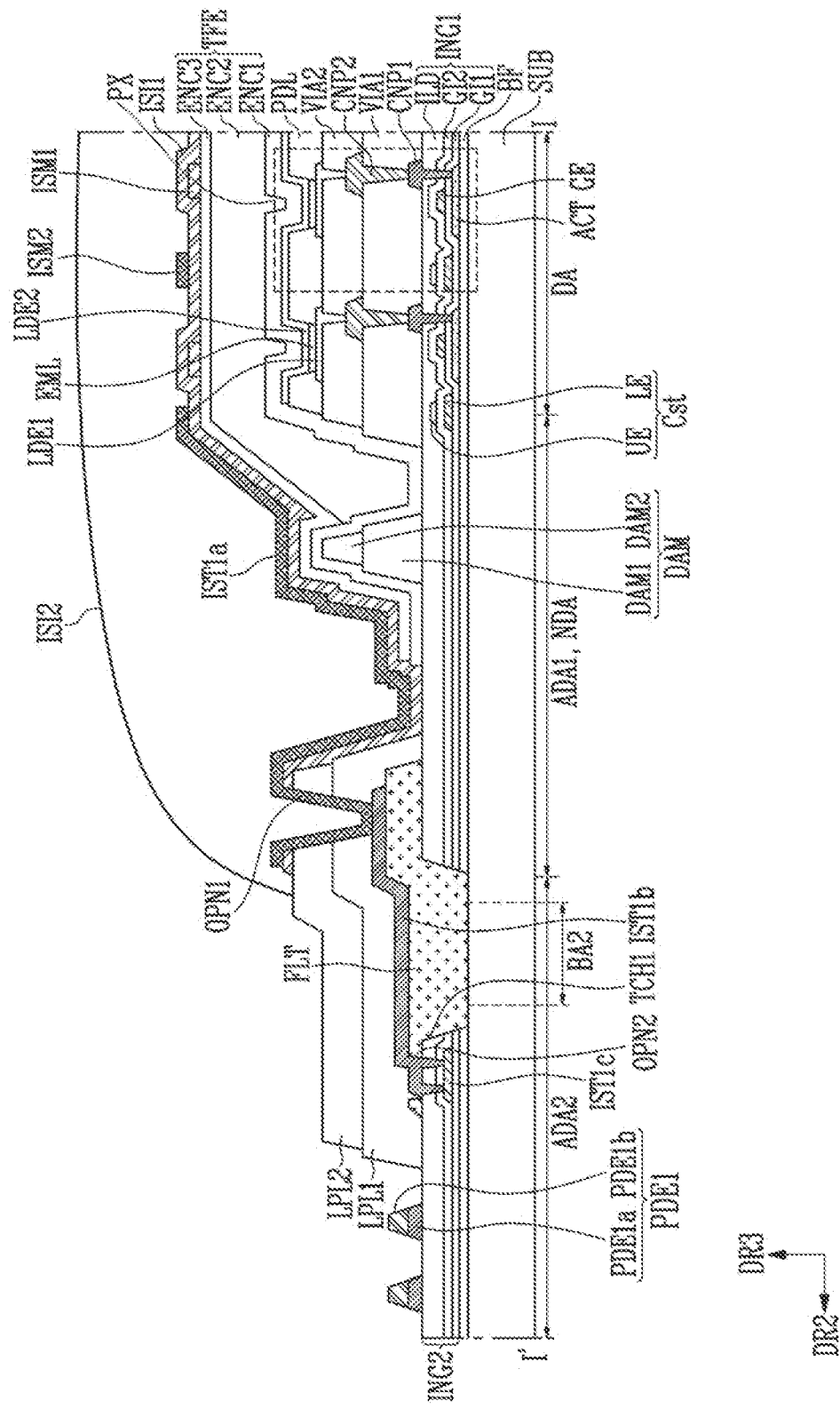

FIG. 22 is a sectional view taken along line I-I' of FIG. 21 in accordance with an embodiment. It is assumed that line I-I' of FIG. 21 passes through the first pad PDE1 and the first sensing line IST1 from the second additional area ADA2 to the display area DA.

First, the display area DA will be described. In an embodiment of the present disclosure, a plurality of pixels PX is provided in the display area DA. Each pixel PX may include a transistor that is connected to a corresponding line among the display lines DST, a light emitting element that is connected to the transistor, and a capacitor Cst. For the sake of explanation, FIG. 22 illustrates one transistor, one light emitting element, and one capacitor Cst that are provided for one pixel PX.

The substrate SUB may be made of an insulating material such as glass or resin. Furthermore, the substrate SUB may be made of a material having flexibility so as to be bendable or foldable, and may have a single-layer structure or a multilayer structure.

For example, the substrate SUB may include at least one of the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material that forms the substrate SUB may be changed in various ways, and the substrate SUB may also be made of fiber-reinforced plastic (FRP) or the like.

For example, in the case in which the substrate SUB has a multilayer structure, a single layer or a plurality of layers made of inorganic material such as silicon nitride, silicon oxide, or silicon oxynitride may be interposed between a plurality of layers of the multilayer structure.

A buffer layer BF may cover the substrate SUB. The buffer layer BL may prevent impurities from diffusing into a channel of the transistor. The buffer layer BF may be an inorganic insulating layer formed of an inorganic material. For example, the buffer layer BF may be formed of silicon nitride, silicon oxide, silicon oxynitride, or the like. The buffer layer BF may be omitted depending on the material of the substrate SUB and the processing conditions. In an embodiment, a barrier layer may be further provided.

An active layer ACT may be disposed on the buffer layer BF. The active layer ACT may be patterned to form a channel, a source electrode, and a drain electrode of the transistor, or a line. The active layer ACT is formed of a semiconductor material. The active layer ACT may be a semiconductor pattern formed of polysilicon, amorphous silicon, an oxide semiconductor, or the like. The channel of the transistor may be a semiconductor pattern undoped with impurities and an intrinsic semiconductor. Each of the source electrode, the drain electrode, and the line may be a semiconductor pattern doped with impurities. The impurities may include n-type impurities, p-type impurities, or other metals.

A first gate insulating layer GI1 may cover the active layer ACT. In this case, the active layer ACT is disposed between the first gate insulating layer GI1 and the buffer layer BF. The first gate insulating layer GI1 may be an inorganic insulating layer formed of inorganic material. Inorganic insulating material such as polysiloxane, silicon nitride, silicon oxide, or silicon oxynitride may be used as the inorganic material.

A gate electrode GE of the transistor and a lower electrode LE of the capacitor Cst may be disposed on the first gate insulating layer GIL. The gate electrode GE may overlap an area that corresponds to the channel.

The gate electrode GE and the lower electrode LE may be made of metal. For example, the gate electrode GE may be made of at least one of metals such as gold (Au), silver (Ag), aluminum (Al), molybdenum (Mo), chrome (Cr), titanium (Ti), nickel (Ni), neodymium (Nd), and copper (Cu), or an alloy of the metals. The gate electrode GE may have a single-layer structure, but is not limited thereto, and it may have a multilayer structure formed by stacking two or more materials selected from among metals and alloys.

A second gate insulating layer GI2 may cover the gate electrode GE and the lower electrode LE. In this case, the gate electrode GE and the lower electrode LE may be disposed between the second gate insulating layer GI2 and the first gate insulating layer GIL. The second gate insulating layer GI2 may be an inorganic insulating layer formed of inorganic material. Polysiloxane, silicon nitride, silicon oxide, silicon oxynitride, or the like may be used as the inorganic material.

The upper electrode UE of the capacitor Cst may be disposed on the second gate insulating layer GI2. The upper electrode UE may be formed of metal. For example, the upper electrode UE may be made of at least one of metals such as gold (Au), silver (Ag), aluminum (Al), molybdenum (Mo), chrome (Cr), titanium (Ti), nickel (Ni), neodymium (Nd), and copper (Cu), or an alloy of the metals. The upper electrode UE may have a single-layer structure, but is not limited thereto, and it may have a multilayer structure formed by stacking two or more materials selected from among metals and alloys.

The lower electrode LE and the upper electrode UE may be provided with the second insulating layer GI2 therebetween, thus forming the capacitor Cst. Although FIG. 22 illustrates that the capacitor Cst has a double-layer electrode structure including the lower electrode LE and the upper electrode UE, in another embodiment, the capacitor Cst may have a triple-layer electrode structure using an active layer ACT, or a triple-layer electrode structure or an electrode structure having four or more layers using an electrode provided on the same layer as that of a first connection pattern CNP1.

An interlayer insulating layer ILD may cover the upper electrode UE. The interlayer insulating layer ILD may be an inorganic insulating layer formed of inorganic material. Polysiloxane, silicon nitride, silicon oxide, silicon oxynitride, or the like may be used as the inorganic material.

In the present embodiment, for the sake of explanation, the first gate insulating layer GI1, the second gate insulating layer GI2, and the interlayer insulating layer ILD may collectively be referred to as a first insulating layer group ING1. The first insulating layer group ING1 may cover a portion of the transistor. In an embodiment, the first insulating layer group ING1 may further include the buffer layer BF.

The first connection pattern CNP1 may be disposed on the interlayer insulating layer ILD. The first connection pattern CNP1 may contact the source electrode and the drain electrode of the active layer ACT through contact holes that are formed in the interlayer insulating layer ILD, the second gate insulating layer GI2, and the first gate insulating layer GIL.

The first connection pattern CNP1 may be formed of metal. For example, each of the source electrode SE and the drain electrode DE may be made of at least one of metals such as gold (Au), silver (Ag), aluminum (Al), molybdenum (Mo), chrome (Cr), titanium (Ti), nickel (Ni), neodymium (Nd), and copper (Cu), or an alloy of the metals.

In an embodiment, a passivation layer may cover the first connection pattern CNP1. The passivation layer may be an inorganic insulating layer formed of an inorganic material. Polysiloxane, silicon nitride, silicon oxide, silicon oxynitride, or the like may be used as the inorganic material.

A first via layer VIA1 may cover the passivation layer or the transistor. The first via layer VIA1 may be an organic insulating layer formed of an organic material. An organic insulating material such as a polyacryl compound, a polyimide compound, a fluorocarbon compound such as Teflon, or a benzocyclobutene compound may be used as the organic material. The organic insulating layer may be deposited by a method such as evaporation.

A second connection pattern CNP2 may be connected to the first connection pattern CNP1 through an opening in the first via layer VIAL. For example, the second connection pattern CNP2 may extend through the first via layer VIA1 to contact an upper surface of the first connection pattern CNP1. The second connection pattern CNP2 may be made of at least one of metals such as gold (Au), silver (Ag), aluminum (Al), molybdenum (Mo), chrome (Cr), titanium (Ti), nickel (Ni), neodymium (Nd), and copper (Cu), or an alloy of the metals.

The second via layer VIA2 may cover the first via layer VIA1 and the second connection pattern CNP2. The second via layer VIA2 may be an organic insulating layer formed of an organic material. An organic insulating material such as a polyacryl compound, a polyimide compound, a fluorocarbon compound such as Teflon, or a benzocyclobutene compound may be used as the organic material.

A first light-emitting-element electrode LDE1 may be connected to the second connection pattern CNP2 through an opening in the second via layer VIA2. Here, in an embodiment, the first light-emitting-element electrode LDE1 may be an anode of the light emitting element.

In an embodiment, the configurations of the second via layer VIA2 and the second connection pattern CNP2 may be omitted, and the first light-emitting-element electrode LDE1 may be directly connected to the first connection pattern CNP1 through the opening in the first via layer VIAL.

The first light-emitting-element electrode LDE1 may be formed of a metal layer made of Ag, Mg, Al, Pt, Pd, Au, Ni, Nd, Ir, Cr, or an alloy thereof, and/or indium tin oxide (ITO), indium zinc oxide (IZO), zinc oxide (ZnO), indium tin zinc oxide, (ITZO), or the like. The first light-emitting-element electrode LDE1 may be made of one kind of metal, but is not limited thereto, and may be made of two or more kinds of metals, e.g., an alloy of Ag and Mg.

The first light-emitting-element electrode LDE1 may be formed of a transparent conductive layer to realize an image in the downward direction of the substrate SUB, or may be formed of a metal reflective layer and/or a transparent conductive layer to realize an image in the upward direction of the substrate SUB.

A pixel-defining layer PDL for defining an emission area of each pixel PX may be provided on the substrate SUB on which the first light-emitting-element electrode LDE1 is formed. The pixel-defining layer PDL may be an organic insulating layer made of an organic material. An organic insulating material such as a polyacryl compound, a polyimide compound, a fluorocarbon compound such as Teflon, or a benzocyclobutene compound may be used as the organic material.

The pixel-defining layer PDL may expose an upper surface of the first light-emitting-element electrode LDE1 and protrude from the substrate SUB along the perimeter of the pixel PX. A light-emitting layer EML may be provided in an area of the pixel PX that is enclosed by the pixel-defining layer PDL.

The light-emitting layer EML may include a low-molecular-weight or high-molecular-weight material. The low-molecular-weight material may include copper phthalocyanine (CuPc), N,N'-Di(naphthalene-1-yl)-N,N'-diphenyl-benzidine (NPB), tris-8-hydroxyquinoline aluminum (Alq3), and the like. Such materials may be formed through a vacuum evaporation method. The high-molecular-weight material may include PEDOT, PPV (poly-phenylenevinylene)-based material, polyfluorene-based material, and the like.

The light-emitting layer EML may have a single-layer structure or a multilayer structure including various functional layers. In the case in which the light-emitting layer EML has a multilayer structure, it may have a structure in which a hole Injection layer, a hole transport layer, an emission layer, an electron transport layer, an electron injection layer, and the like are stacked in a single-layer structure or a complex structure. The light-emitting layer EML may be formed through a screen-printing method, an inkjet-printing method, a laser-induced thermal-imaging (LITI) method, or the like.

In an embodiment, at least a portion of the light-emitting layer EML may be integrally formed over a plurality of first light-emitting-element electrodes LDE1, or may be provided in pieces to respectively correspond to a plurality of first light-emitting-element electrodes LDE1.

A second light-emitting-element electrode LDE2 may be provided on the light-emitting layer EML. In this case, the light-emitting layer EML may be sandwiched between the second light-emitting-element electrode LDE2 and the first light-emitting-element electrode LDE1. The second light-emitting-element electrode LDE2 may be provided for each pixel PX. Alternatively, the second light-emitting-element electrode LDE2 may be provided to cover most of the display area DA, and may be shared by a plurality of pixels PX.

The second light-emitting-element electrode LDE2 may be used as a cathode or an anode, depending on the embodiment. In the case in which the first light-emitting-element electrode LDE1 is an anode, the second light-emitting-element electrode LDE2 may be used as a cathode. In the case in which the first light-emitting-element electrode LDE1 is a cathode, the second light-emitting-element electrode LDE2 may be used as an anode.

The second light-emitting-element electrode LDE2 may be formed of a metal layer made of Ag, Mg, Al, Pt, Pd, Au, Ni, Nd, Ir, Cr, or the like, and/or a transparent conductive layer made of indium tin oxide (ITO), indium zinc oxide (IZO), zinc oxide (ZnO), indium tin zinc oxide (ITZO), or the like. In an embodiment of the present disclosure, the second light-emitting-element electrode LDE2 may be formed of a multilayer structure having two or more layers including a thin metal layer. For example, the second light-emitting-element electrode LDE2 may be formed of a triple-layer structure of ITO/Ag/ITO.

The second light-emitting-element electrode LDE2 may be formed of a metal reflective layer and/or a transparent conductive layer to realize an image in the downward direction of the substrate SUB, or may be formed of a transparent conductive layer to realize an image in the upward direction of the substrate SUB.

An assembly including the first light-emitting-element electrode LDE1, the light-emitting layer EML, and the second light-emitting-element electrode LDE2 may be referred to as a light emitting element.

The encapsulation layer TFE may be provided on the second light-emitting-element electrode LDE2. The encapsulation layer TFE may be formed of a single layer or multiple layers. In an embodiment, the encapsulation layer TFE may include first, second third encapsulation layers ENC1, ENC2, and ENC3. The first to third encapsulation layers ENC1, ENC2, and ENC3 may be made of organic material and/or inorganic material. Disposed at the outermost position, the third encapsulation layer ENC3 may be made of an inorganic material. For example, the first encapsulation layer ENC1 may be formed of an inorganic layer made of an inorganic material, the second encapsulation layer ENC2 may be formed of an organic layer made of an organic material, and the third encapsulation layer ENC3 may be formed of an inorganic layer made of an inorganic material. In the case of the inorganic material, resistance to penetration of water or oxygen is superior compared to the organic material, but the inorganic material is prone to cracking because it has low flexibility. In the present embodiment, since the first encapsulation layer ENC1 and the third encapsulation layer ENC3 are made of the inorganic material and the second encapsulation layer ENC2 is made of the organic material, cracks may be prevented from spreading. Here, a layer made of the organic material, e.g., the second encapsulation layer ENC2, may be fully covered with the third encapsulation layer ENC3 so that an edge of the second encapsulation layer ENC2 can be prevented from being exposed to the outside. In an embodiment, an organic insulating material such as a polyacryl compound, a polyimide compound, a fluorocarbon compound such as Teflon, or a benzocyclobutene compound may be used as the organic material. Polysiloxane, silicon nitride, silicon oxide, silicon oxynitride, or the like may be used as the inorganic material.

The light-emitting layer EML that forms a light emitting element may be easily damaged by external water, oxygen, or the like. The encapsulation layer TFE covers and protects the light-emitting layer EML. The encapsulation layer TFE may cover the display area DA and extend to the non-display area NDA, which is formed outside the display area DA. Insulating layers made of an organic material are advantageous in terms of flexibility, elasticity, and the like, but are vulnerable to penetration of water or oxygen compared to insulating layers made of an inorganic material. In an embodiment of the present disclosure, to prevent water or oxygen from penetrating into the insulating layers made of the organic material, the insulating layers made of the organic material may be covered with insulating layers made of the inorganic material such that edges of the insulating layers made of the organic material are not exposed to the outside. For example, the first via layer VIA1, the second via layer VIA2, and the pixel-defining layer PDL, all of which are made of the organic material, may be covered with the first encapsulation layer ENC1 rather than extending to the non-display area NDA. Hence, an upper surface of the pixel-defining layer PDL and sidewalls of the first via layer VIA1, the second via layer VIA2, and the pixel-defining layer PDL may be encapsulated by the encapsulation layer TFE including the inorganic material, and may thus be prevented from being exposed to the outside.

The layer structure or material of the encapsulation layer TFE is not limited to the foregoing embodiment, and may be changed in various ways. For example, the encapsulation layer TFE may include a plurality of organic material layers and a plurality of Inorganic material layers that are alternately stacked.

A first sensing electrode layer ISM1 may be disposed on the encapsulation layer TFE. In an embodiment, an additional buffer layer may be disposed between the first sensing electrode layer ISM1 and the encapsulation layer TFE. The first sensing electrode layer ISM1 may be formed of a metal layer made of Ag, Mg, Al, Pt, Pd, Au, Ni, Nd, Ir, Cr, or the like, and/or a transparent conductive layer made of indium tin oxide (ITO), indium zinc oxide (IZO), zinc oxide (ZnO), indium tin zinc oxide (ITZO), or the like.

A first sensing insulating layer ISI1 may be provided on the first sensing electrode layer ISM1. The first sensing insulating layer ISI1 may be an inorganic insulating layer formed of an inorganic material. An inorganic insulating material such as polysiloxane, silicon nitride, silicon oxide, or silicon oxynitride may be used as the inorganic material.

A second sensing electrode layer ISM2 may be provided on the first sensing insulating layer ISI1. In this case, the first sensing electrode layer ISM1 and the second sensing electrode layer ISM2 may be separated by the first sensing insulating layer ISI1. The second sensing electrode layer ISM2 may be formed of a metal layer made of Ag, Mg, Al, Pt, Pd, Au, Ni, Nd, Ir, Cr, or the like, and/or a transparent conductive layer made of indium tin oxide (ITO), indium zinc oxide (IZO), zinc oxide (ZnO), indium tin zinc oxide (ITZO), or the like.

The fact that various input-sensing components may be formed using the first sensing electrode layer ISM1, the first sensing insulating layer ISI1, and the second sensing electrode layer ISM2 will be described below with reference to FIGS. 24 to 26.

In an embodiment of FIG. 22, a first pattern IST1a of the first sensing layer IST1 may be formed by patterning the second sensing electrode layer ISM2.

A second sensing insulating layer ISI2 may be provided on the second sensing electrode layer ISM2. The second sensing insulating layer ISI2 may be formed of an organic layer. For example, an organic insulating material such as a polyacryl compound, a polyimide compound, a fluorocarbon compound such as Teflon, or a benzocyclobutene compound may be used as the organic material. For example, the second sensing insulating layer ISI2 may be formed of polymethyl methacrylate, polydimethylsiloxane, polyimide, acrylate, polyethylene terephthalate, polyethylene naphthalate, or the like.

Next, the non-display area NDA, the first additional area ADA1, and the second additional area ADA2 will be described. In a sectional view of FIG. 22, distinguishment of the non-display area NDA and the first additional area ADA1 Is not significant. Hence, in the following description, the non-display area NDA and the first additional area ADA1 are not distinguished from each other. In the following description of the non-display area NDA and the second additional area ADA2, explanation of content the same as that described above will be omitted or simplified to avoid redundancy of explanation.

A dam DAM may be disposed on a boundary of the second encapsulation layer ENC2. For example, the dam DAM may be disposed between a planarization layer FLT and the second encapsulation layer ENC2. The dam DAM may have a multilayer structure Including, for example, a first dam DAM1 and a second dam DAM2. For example, the first and second dams DAM1 and DAM2 may be made of an organic material. Each of the first and second dams DAM1 and DAM2 may correspond to any one of the first via layer VIA1, the second via layer VIA2, and the pixel-defining layer PDL. For example, in the case in which the first dam DAM1 is formed of the same material as the first via layer VIA1 through the same process, the second dam DAM2 may be formed of the same material as the second via layer VIA2 or the pixel-defining layer PDL through the same process. Alternatively, in the case in which the first dam DAM1 is formed of the same material as the second via layer VIA2 through the same process, the second dam DAM2 may be formed of the same material as the pixel-defining layer PDL through the same process. In addition, in the case in which a spacer is formed on the pixel-defining layer PDL of the display area DA, the dam DAM may be formed of the same material as that of the spacer.

The dam DAM may prevent the organic material of the second encapsulation layer ENC2, which has high fluidity, from overflowing out of the dam DAM during a fabrication process. The first and third encapsulation layers ENC1 and ENC3, which are made of an inorganic material, may extend and cover the dam DAM so that an adhesive force with the substrate SUB or other layers over the substrate SUB can be enhanced.

The first pad PDE1 may be disposed on the substrate SUB, and may be spaced apart from the planarization layer FLT. The first pad PDE1 may be supported by a second insulating layer group ING2. Insulating layers of the second insulating layer group ING2 may respectively correspond to the insulating layers of the first insulating layer group ING1. For example, the second insulating layer group ING2 may include the interlayer insulating layer ILD, the second gate insulating layer GI2, and the first gate insulating layer GIL. The first pad PDE1 may include a first pad electrode PDE1a and a second pad electrode PDE1b. The first pad electrode PDE1a may be formed of the same material as the first connection pattern CNP1. The second pad electrode PDE1b may be formed of the same material as the second connection pattern CNP2.

The planarization layer FLT may be disposed on the substrate SUB, and may be spaced apart from an area that covers the encapsulation layer TFE. The planarization layer FLT may be an organic insulating layer made of an organic material. An organic insulating material such as a polyacryl compound, a polyimide compound, a fluorocarbon compound such as Teflon, or a benzocyclobutene compound may be used as the organic material.

In the present embodiment, the planarization layer FLT may be formed before the first connection pattern CNP1 is formed and after the interlayer insulating layer ILD is formed. Therefore, the planarization layer FLT and the first via layer VIA1 may be formed through different processes.

In an embodiment, the planarization layer FLT and the first via layer VIA1 may include different organic materials.

One end of the planarization layer FLT may cover the first insulating layer group ING1. Furthermore, a portion of the planarization layer FLT that corresponds to the second bending area BA2 may be disposed in a first trench TCH1 between the first insulating layer group ING1 and the second insulating layer group ING2. The portion of the planarization layer FLT in the first trench TCH1 may contact a surface of the substrate SUB.

Since the inorganic insulating layers are higher in hardness and lower in flexibility than the organic Insulating layers, there is a relatively high probability of the inorganic insulating layers cracking. In the case in which cracks occur in the inorganic insulating layers, the cracks may spread to lines on the inorganic insulating layers, whereby a defect such as line disconnection may be caused.

Therefore, as illustrated in FIG. 22, the first trench TCH1 may be formed by removing the inorganic insulating layers from the second bending area BA2, so that the first insulating layer group ING1 and the second insulating layer group ING2 may be separated from each other. Although, in the present embodiment, all of the inorganic insulating layers corresponding to the area of the first trench TCH1 are removed, some inorganic insulating layers may remain in other embodiments. In this case, those inorganic insulating layers that remain may have slits formed therein so that bending stress can be dispersed.

A second pattern IST1b of the first sensing line ISI1 may extend on the planarization layer FLT, and may be electrically connected with the first pad PDE1. In the present embodiment, the second pattern IST1b may be formed of the same material as the first connection pattern CNP1 through the same process.

A first line-protecting layer LPL1 may cover the planarization layer FLT and the second pattern IST1b. Furthermore, a second line-protecting layer LPL2 may cover the first line-protecting layer LPL1. In an embodiment, the configuration of the second line-protecting layer LPL2 may be omitted. The first and second line-protecting layers LPL1 and LPL2 may be formed of an organic material. Each of the first and second line-protecting layers LPL1 and LPL2 may correspond to any one of the first via layer VIA1, the second via layer VIA2, and the pixel-defining layer PDL. For example, in the case in which the first line-protecting layer LPL1 is formed of the same material as the first via layer VIA1 through the same process, the second line-protecting layer LPL2 may be formed of the same material as the second via layer VIA2 or the pixel-defining layer PDL through the same process. Alternatively, in the case in which the first line-protecting layer LPL1 is formed of the same material as the second via layer VIA2 through the same process, the second line-protecting layer LPL2 may be formed of the same material as the pixel-defining layer PDL through the same process.

The first and second line-protecting layers LPL1 and LPL2 and the first sensing insulating layer ISI1 may include a first opening OPN1, through which the second pattern IST1b is exposed.

The first pattern IST1a may be connected with the second pattern IST1b through the first opening OPN1. The connection point of the first pattern IST1a and the second pattern IST1b may overlap the planarization layer FLT. In the present embodiment, the height of the portion of the second pattern IST1b that is disposed on the first insulating layer group ING1 and on one end of the planarization layer FLT may be greater than the height of the portion of the second pattern IST1b that is disposed on the planarization layer FLT corresponding to the first trench TCH1.

Therefore, the first pattern IST1a and the second pattern IST1b may be directly connected to each other without a separate bridge line. Since the bridge line is not provided, the reliability of connection between the first pattern IST1a and the second pattern IST1b may be enhanced. In addition, the length of the non-display area NDA may be reduced by the length of the bridge line, whereby the amount of dead space may be reduced and a thin bezel may be easily embodied.

A third pattern IST1c of the first sensing line IST1 may connect the first pad PDE1 and the second pattern ISTb to each other. The third pattern IST1c may be formed of the same material as the gate electrode GE of the transistor through the same process. In an embodiment, the third pattern IST1c may be formed of the same material as the upper electrode UE through the same process. In an embodiment, odd-numbered third patterns IST1c may be formed of the same material as that of the gate electrode GE of the transistor through the same process. Even-numbered third patterns IST1c may be formed of the same material as the upper electrode UE through the same process. In contrast, the even-numbered third patterns IST1c may be formed of the same material as the gate electrode GE of the transistor through the same process. The odd-numbered third patterns IST1c may be formed of the same material as the upper electrode UE through the same process. Hence, a short-circuit between adjacent lines may be more efficiently prevented.

The second insulating layer group ING2 may include a second opening OPN2, through which the third pattern IST1c is exposed. Furthermore, the planarization layer FLT may include an opening corresponding to the second opening OPN2. The second pattern IST1b may be connected with the third pattern IST1c through the second opening OPN2.

Figure 23:
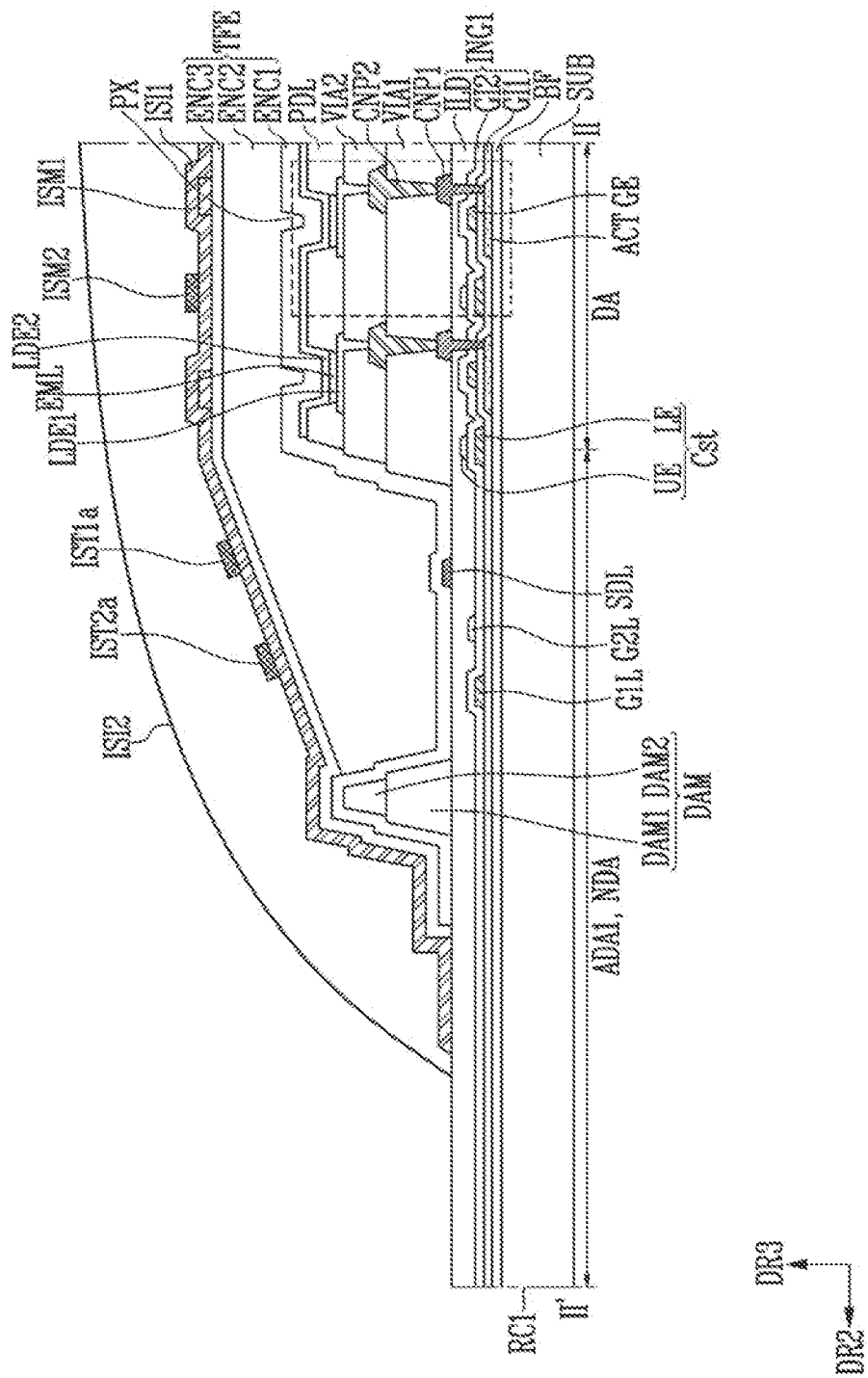

FIG. 23 is a sectional view taken along line II-II' of FIG. 21 in accordance with an embodiment of the present disclosure.

Line II-II' of FIG. 21 may correspond to the first bending axis BX1. Here, the same embodiments may be applied not only to the first side edge RC1 but also to the second side edge RC2.

The display lines DST may be formed of a single-layer line or multilayer line using at least one of lines, e.g., the first gate insulating layer G1L, the second gate insulating layer G2L, and SDL. The line, e.g., the first gate insulating layer G1L, may be formed of the same material as the gate electrode GE through the same process. The line, e.g., the second gate insulating layer G2L, may be formed of the same material as the upper electrode UE through the same process. The line SDL may be formed of the same material as the first connection pattern CNP1 through the same process.

The first and second patterns IST1a and IST2a of the first and second sensing lines IST1 and IST2 may be disposed on the encapsulation layer TFE and the first sensing insulating layer ISI1 (based on the third direction DR3), and may be disposed between the dam DAM and the display area DA (based on the second direction DR2). The first sensing insulating layer ISI1 may be disposed between the encapsulation layer TFE and the first and second sensing lines IST1 and IST2.

Figure 24:
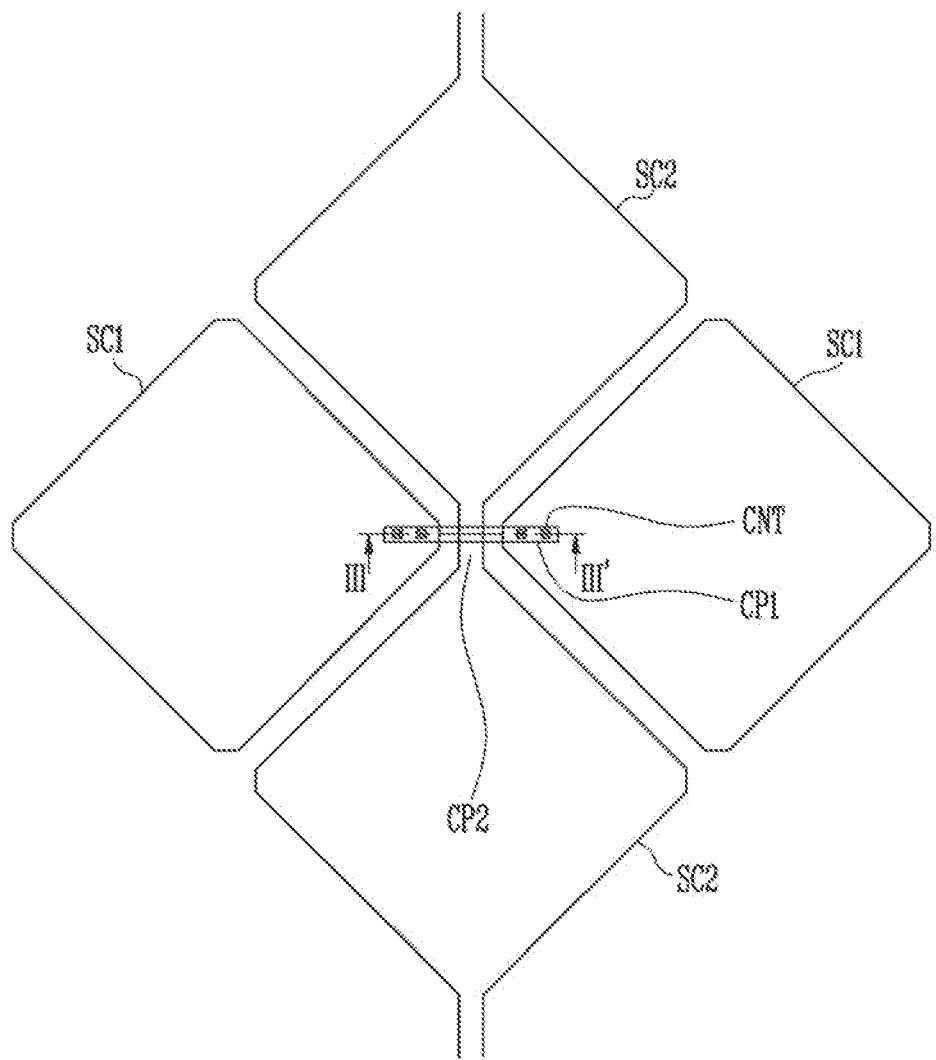
Figure 25:
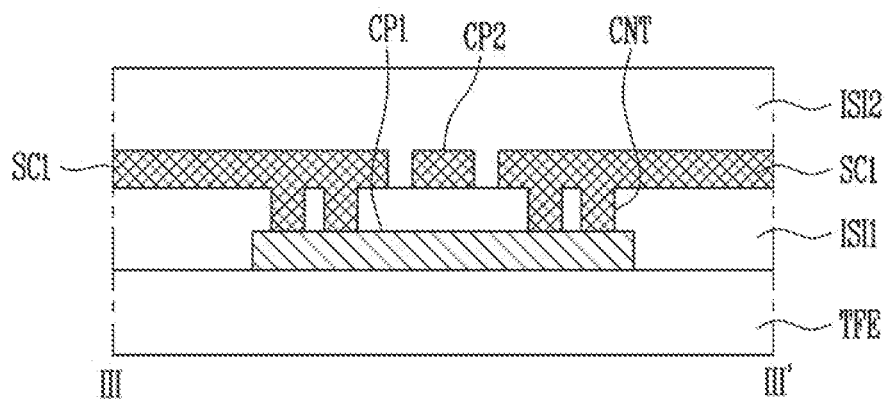

FIGS. 24 and 25 are diagrams for describing sensing electrodes and bridge electrodes in accordance with an embodiment of the present disclosure. FIG. 25 is a sectional view taken along line III-III' of FIG. 24.

The bridge electrodes CP1 may be disposed on the encapsulation layer TFE by patterning the first sensing electrode layer ISM1.

The first sensing insulating layer ISI1 may cover the bridge electrodes CP1, and may include contact holes CNT that expose portions of the bridge electrodes CP1.

The first sensing electrodes SC1 and the second sensing electrodes SC2 may be formed on the first sensing insulating layer ISI1 by patterning the second sensing electrode layer ISM2. The first sensing electrodes SC1 may be connected to the bridge electrode CP1 through the contact holes CNT.

The second sensing electrodes SC2 may have a connection pattern CP2 formed on the same layer by patterning the second sensing electrode layer ISM2. Therefore, there is no need to use a separate bridge electrode to connect the second sensing electrodes SC2 to each other.

In an embodiment, each of the first and second sensing electrodes SC1 and SC2 may cover a plurality of pixels PX. Here, in the case in which the first and second sensing electrodes SC1 and SC2 are formed of an opaque conductive layer, each of the first and second sensing electrodes SC1 and SC2 may Include a plurality of openings that expose a plurality of pixels PX that are covered by the corresponding first or second sensing electrode SC1 or SC2. For example, each of the first and second sensing electrodes SC1 and SC2 may have a mesh form. In the case in which each of the first and second sensing electrodes SC1 and SC2 is formed of a transparent conductive layer, each of the first and second sensing electrodes SC1 and SC2 may be provided in the form of a plate with no opening therein.

FIG. 26 is a diagram for describing sensing electrodes and bridge electrodes in accordance with another embodiment of the present disclosure.

FIG. 26 is another sectional view taken along line III-III' of FIG. 24.

The first sensing electrodes SC1 and the second sensing electrodes SC2 may be formed by patterning the first sensing electrode layer ISM1, and may be disposed on the encapsulation layer TFE.

The first sensing insulating layer ISI1 may cover the first sensing electrodes SC1 and the second sensing electrodes SC2, and may include contact holes CNT that expose portions of the first and second sensing electrodes SC1 and SC2.

The bridge electrodes CP1 may be formed by patterning the second sensing electrode layer ISM2, and may be disposed on the first sensing insulating layer ISI1. The bridge electrodes CP1 may be connected to the first sensing electrodes SC1 through the contact holes CNT.

Figure 27:
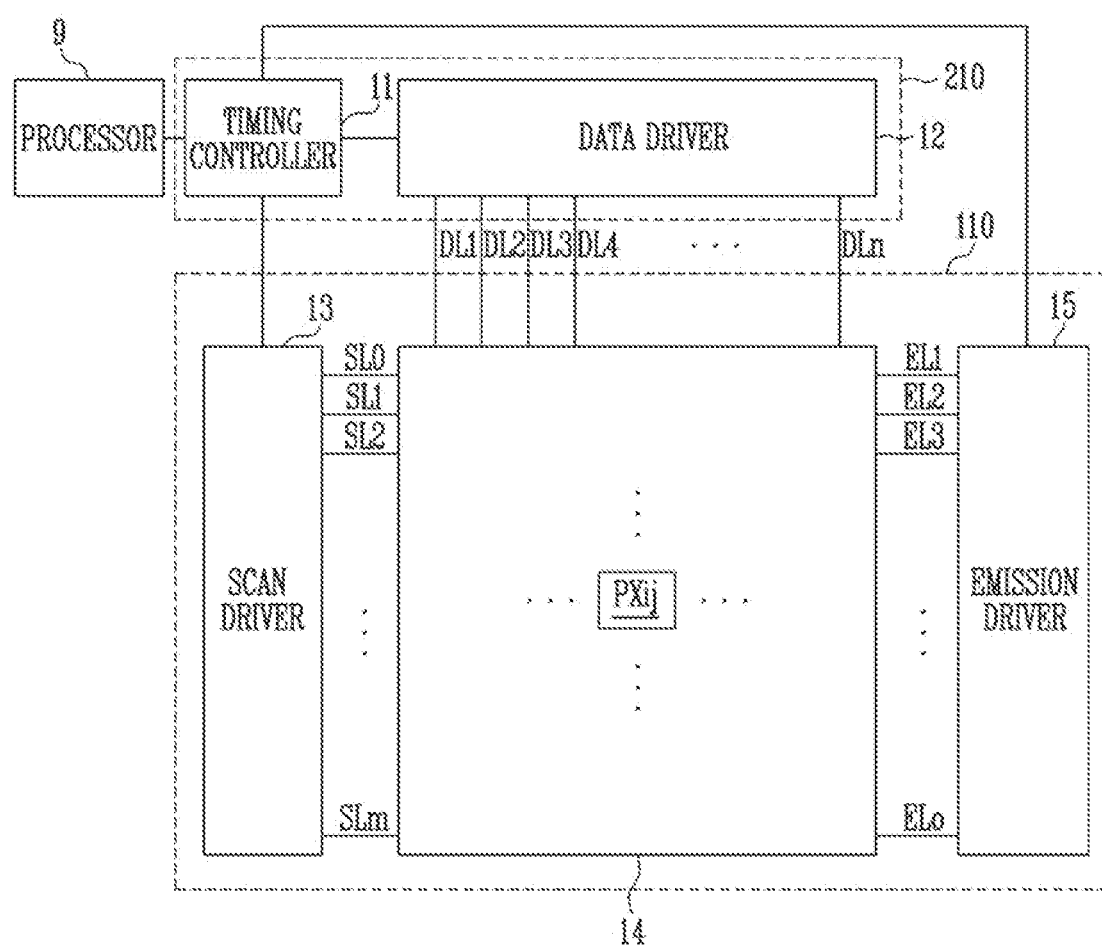
FIGS. 27, 28 and 29 are diagrams for describing a display device including pixels in accordance with an embodiment of the present disclosure.
Figure 28:
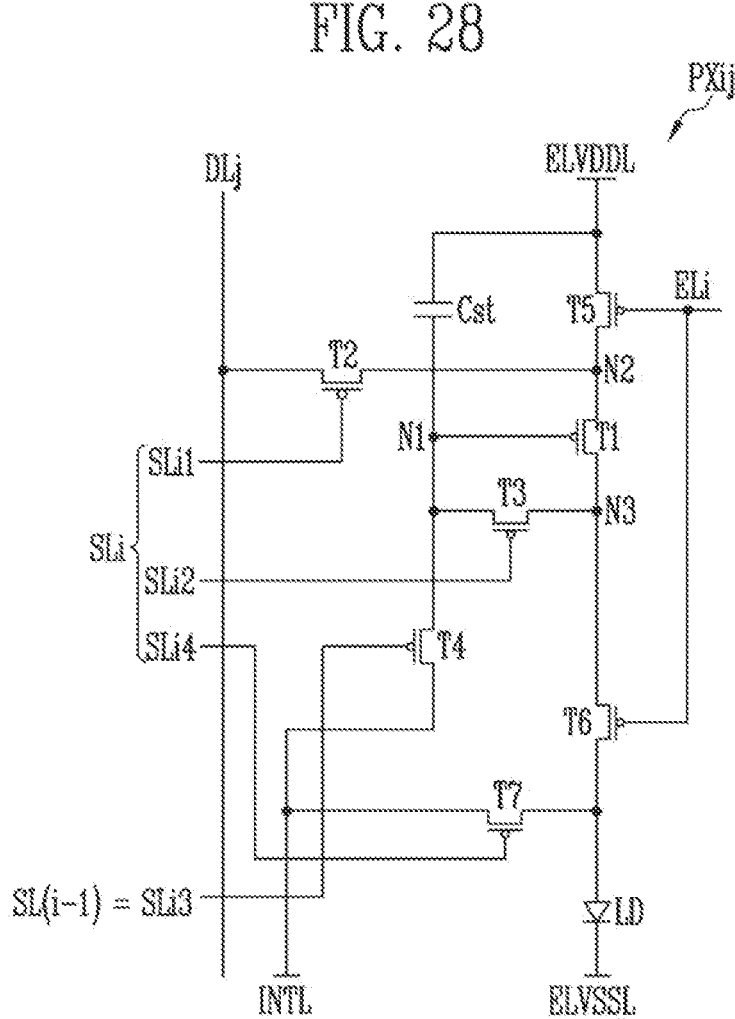
Figure 29:
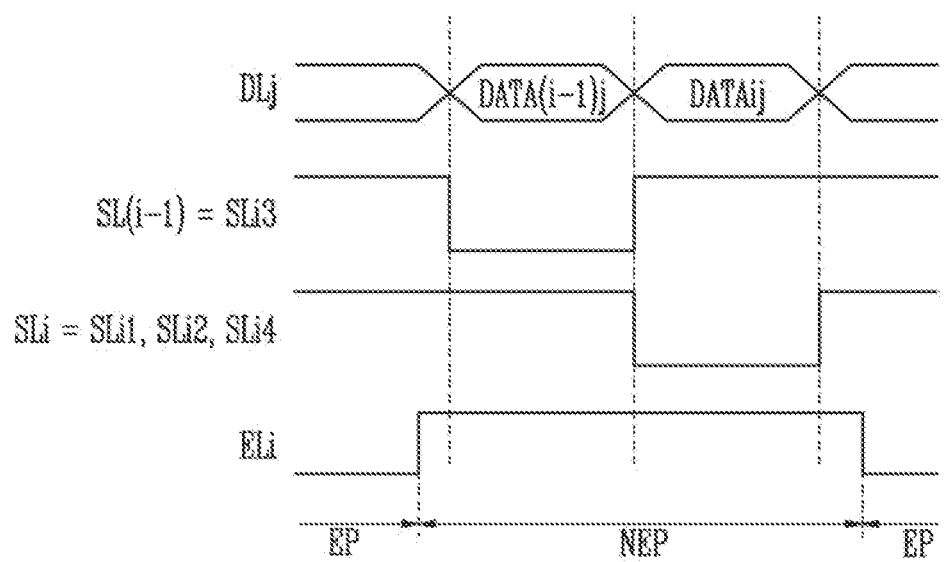

FIGS. 27 to 29 are diagrams for describing a display device including a pixel in accordance with an embodiment of the present disclosure.

FIG. 27 is a diagram illustrating a display component 110 and a display driver 210 in accordance with an embodiment of the present disclosure.

Referring to FIG. 27, the display driver 210 may include a timing controller 11 and a data driver 12. The display component 110 may include a scan driver 13, a pixel component 14, and an emission driver 15. Here, as described above, the configuration of the foregoing functional components pertaining to, for example, whether to integrate the foregoing functional components on one IC or a plurality of ICs or whether to mount the functional components on a display substrate 111 may be changed in various ways depending on the specifications of the display device 1.

The timing controller 11 may receive grayscale signals and timing signals for each display frame period from a processor 9. Here, the processor may correspond to at least one of a graphics processing unit (GPU), a central processing unit (CPU), an application processor (AP), and the like. The timing signals may include a vertical synchronization signal, a horizontal synchronization signal, a data enable signal, and the like.

Each cycle of the vertical synchronization signal may correspond to a corresponding display frame period. Each cycle of the horizontal synchronization signal may correspond to a corresponding horizontal period. The grayscale signals may be supplied on a horizontal-line basis in response to a pulse of an enable level of a data enable signal during each horizontal period. The horizontal line may refer to pixels (e.g., a pixel line) connected to the same scan line and the same emission line.

The timing controller 11 may render the grayscale signals in consideration of the specifications of the display device 1. For example, the processor 9 may provide a red grayscale signal, a green grayscale signal, and a blue grayscale signal for each unit dot. For example, in the case in which the pixel component 14 has a red, green blue (RGB) stripe structure, pixels may correspond one to one to respective grayscale signals. In this case, the rendering of the grayscale signals may not be needed. However, for example, in the case where the pixel circuit 14 has a PENTILE™ structure, because adjacent unit dots may share a pixel, the pixels may not correspond one to one to the respective grayscale signals. In this case, rendering of the grayscale signals may be necessary. Grayscale signals that have been rendered or have not been rendered may be provided to the data driver 12. Furthermore, the timing controller 11 may provide a data control signal to the data driver 12. In addition, the timing controller 11 may provide a scan control signal to the scan driver 13, and may provide an emission control signal to the emission driver 15.

The data driver 12 may generate, using the grayscale signals and the data control signal received from the timing controller 11, data voltages (e.g., data signals) to be provided to data lines DL1, DL2, DL3, . . . , DLn. Here, n is an integer greater than 0.

The scan driver 13 may generate, using scan control signals (e.g., a clock signal, a scan start signal, and the like) received from the timing controller 11, scan signals to be provided to scan lines SL0, SL1, SL2, . . . , SLm. The scan driver 13 may sequentially supply scan signals each having a turn-on level pulse to the scan lines SL0 to SLm. The scan driver 13 may include scan stages configured in the form of a shift register. The scan driver 13 may generate scan signals in such a way as to sequentially transmit a scan start signal having a turn-on level pulse to a subsequent scan stage under the control of a clock signal. Here, m is an integer greater than 0.

The emission driver 15 may generate, using emission control signals (e.g., a clock signal, an emission stop signal, and the like) received from the timing controller 11, emission signals to be provided to emission lines EL1, EL2, EL3, . . . , ELo. The emission driver 15 may sequentially supply emission signals each having a turn-on level pulse to the emission lines EL1 to ELo. The emission driver 15 may include emission stages, each of which is configured in the form of a shift register. The emission driver 15 may generate emission signals in such a way as to sequentially transmit an emission stop signal having a turn-off level pulse to a subsequent emission stage under the control of a clock signal. Here, o is an integer greater than 0.

The pixel component 14 includes pixels. Each pixel PXij may be connected to a corresponding data line, a corresponding scan line, and an emission line. The pixels may include pixels configured to emit a first color of light, pixels configured to emit a second color of light, and pixels configured to emit a third color of light. The first color, the second color, and the third color may be different colors. For example, the first color may be one of red, green, and blue. The second color may be one of red, green, and blue, other than the first color. The third color may be the remaining color among red, green, and blue, other than the first color and the second color. Furthermore, in lieu of red, green, and blue, magenta, cyan, and yellow may be used as the first to third colors.

FIG. 28 is a diagram Illustrating a pixel PXij in accordance with an embodiment of the present disclosure.

Referring to FIG. 28, the pixel PXij includes first, second, third, fourth, fifth, sixth and seventh transistors T1, T2, T3, T4, T5, T6, and T7, a storage capacitor Cst, and a light emitting element LD.

Hereinafter, a circuit configured of P-type transistors will be described by way of example. However, those skilled in the art may design a circuit configured of N-type transistors by changing the polarity of the voltage to be applied to the gate terminal of each transistor. Likewise, those skilled in this art may design a circuit configured of a combination of a P-type transistor and an N-type transistor. The term "P-type transistor" is a general name for transistors in which the amount of current increases when a voltage difference between a gate electrode and a source electrode increases in a negative direction. The term "N-type transistor" is a general name for transistors in which the amount of current increases when a voltage difference between a gate electrode and a source electrode increases in a positive direction. Each transistor may be configured in various forms, such as a thin-film transistor (TFT), a field-effect transistor (FET), and a bipolar junction transistor (BJT).

The first transistor T1 may include a gate electrode connected to a first node N1, a first electrode connected to a second node N2, and a second electrode connected to a third node N3. The first transistor T1 may be referred to as a driving transistor.

The second transistor T2 may include a gate electrode connected to a scan line SLi1, a first electrode connected to a data line DLj, and a second electrode connected to the second node N2. In this case, the second electrode of the second transistor T2 may be connected to the gate electrode of the first transistor T1. The second transistor T2 may be referred to as a scan transistor.

The third transistor T3 may include a gate electrode connected to a scan line SLi2, a first electrode connected to the first node N1, and a second electrode connected to the third node N3. In this case, the first electrode of the third transistor T3 may be connected to the gate electrode of the first transistor T1. The third transistor T3 may be referred to as a diode connection transistor.

The fourth transistor T4 may include a gate electrode connected to a scan line SLi3, a first electrode connected to the first node N1, and a second electrode connected to an initialization line INTL. In this case, the first electrode of the fourth transistor T4 may be connected to the gate electrode of the first transistor T1. The fourth transistor T4 may be referred to as a gate initialization transistor.

The fifth transistor T5 may Include a gate electrode connected to an i-th emission line ELi, a first electrode connected to a first power line ELVDDL, and a second electrode connected to the node N2. The fifth transistor T5 may be referred to as an emission transistor. In an embodiment, the gate electrode of the fifth transistor T5 may be connected to an emission line different from the emission line to which a gate electrode of the sixth transistor T6 is connected.

The sixth transistor T6 may include the gate electrode connected to the i-th emission line ELi, a first electrode connected to the third node N3, and a second electrode connected to an anode of the light emitting element LD. The sixth transistor T6 may be referred to as an emission transistor.

The seventh transistor T7 may include a gate electrode connected to a scan line SLi4, a first electrode connected to the initialization line INTL, and a second electrode connected to the anode of the light emitting element LD. The seventh transistor T7 may be referred to as a light-emitting-element initialization transistor.

The storage capacitor Cst may include a first electrode connected to the first power line ELVDDL and a second electrode connected to the first node N1.

The light emitting element LD may include the anode, connected to the second electrode of the sixth transistor T6, and a cathode, connected to a second power line ELVSSL. The light emitting element LD may be a light emitting diode. The light emitting element LD may be formed of an organic light emitting diode, an inorganic light emitting diode, a quantum dot/well light emitting diode, or the like. The light emitting element LD may emit light having any one of a first color, a second color, and a third color. Although, in the present embodiment, only one light emitting element LD is provided in each pixel, a plurality of light emitting elements may be provided in each pixel in another embodiment. Here, the plurality of light emitting elements may be connected to each other in series, parallel, or series-parallel.

A first power voltage may be applied to the first power line ELVDDL. A second power voltage may be applied to the second power line ELVSSL. An initialization voltage may be applied to the initialization line INTL. For example, the first power voltage may be greater than the second power voltage. For example, the initialization voltage may be the same as or greater than the second power voltage. For example, the initialization voltage may correspond to the lowest data voltage among data voltages that can be provided. In an embodiment, the level of the initialization voltage may be less than the levels of the data voltages that can be provided.

FIG. 29 is a diagram for describing an example of a method of driving the pixel of FIG. 28.

Hereinafter, for convenience of explanation, it is assumed that each of the scan lines SLi1, SLi2, and SLi4 is an i-th scan line SLi, and that the scan line SLi3 is an i−1-th scan line SL(i−1). Here, connection relationships between the scan lines SLi1, SLi2, SLi3, and SLi4 may be changed in various ways depending on a particular embodiment. For example, the scan line SLi4 may be an i−1-th scan line or an i+1-th scan line.

First, an emission signal having a turn-off level (a logic high level) may be applied to the i-th emission line Eli. A data voltage DATA(i−1)j for an i−1-th pixel may be applied to the data line DLj. A scan signal having a turn-on level (a logic low level) may be applied to the scan line SLi3. Whether the logic level is high or low may be changed depending on whether the transistor is a P-type or an N-type.

Here, since a scan signal having a turn-off level is applied to the scan lines SLi1 and SLI2, the second transistor T2 is turned off, so that the data voltage DATA(i−1)j for the i−1-th pixel may be prevented from being drawn into the pixel PXij.

Here, since the fourth transistor T4 is turned on, the first node N1 is connected to the initialization line INTL and the voltage of the first node N1 is initialized. Since an emission signal having a turn-off level is applied to the emission line ELi, the fifth and sixth transistors T5 and T6 are turned off, and the light emitting element LD may be prevented from being unnecessarily operated during an Initialization voltage application process.

Next, a data voltage DATAij for the i-th pixel PXij is applied to the data line DLj, and a scan signal having a turn-on level is applied to the scan lines SLi1 and SLI2. Hence, the second, first and third transistors T2, T1, and T3 enter a state capable of conducting electricity, and the data line DLj and the first node N1 are electrically connected to each other. Therefore, a compensation voltage obtained by subtracting a threshold voltage of the first transistor T1 from the data voltage DATAij is applied to the second electrode (e.g., the first node N1) of the storage capacitor Cst. The storage capacitor Cst may maintain a voltage corresponding to the difference between the first power voltage and the compensation voltage. This period may be referred to as a threshold voltage compensation period or a data write period.

Furthermore, in the case in which the scan line SLi4 is an i-th scan line, the seventh transistor T7 is turned on, so that the anode of the light emitting element LD and the initialization line INTL may be connected and the light emitting element LD may be initialized with a magnitude of charge corresponding to the difference between the Initialization voltage and the second power voltage.

Thereafter, as an emission signal having a turn-on level is applied to the i-th emission line ELi, the fifth and sixth transistors T5 and T6 may conduct electricity. Therefore, a driving current path that connects the first power line ELVDDL, the fifth transistor T5, the first transistor T1, the sixth transistor T6, the light emitting element LD, and the second power line ELVSSL may be formed.

The amount of driving current that flows through the first electrode and the second electrode of the first transistor T1 may be adjusted in response to the voltage maintained in the storage capacitor Cst. The light emitting element LD may emit light at a luminance corresponding to the amount of driving current. The light emitting element LD may emit light until an emission signal having a turn-off level is applied to the emission line ELi.

When the emission signal is at a turn-on level, pixels that receive the corresponding emission signal may be in a display state. Therefore, the period during which the emission signal is at a turn-on level may be referred to as an emission period EP (or an emission enable period). Furthermore, when the emission signal is at a turn-off level, pixels that receive the corresponding emission signal may be in a non-display state. Therefore, the period during which the emission signal is at a turn-off level may be referred to as a non-emission period NEP (or an emission inhibit period).

The non-emission period NEP described with reference to FIG. 29 may be for preventing the pixel PXij from emitting light at a undesired luminance during the initialization period and the data write period.

In a sensor device and a method of driving the sensor device in accordance with an embodiment of the present disclosure, even if an allocated sensing time is reduced, a touch position can be accurately detected by increasing a signal-to-noise ratio.

Although embodiments of the present disclosure have been disclosed for illustrative purposes, those skilled in the art will appreciate that various modifications, additions, and substitutions are possible, without departing from the scope and spirit of the present disclosure as disclosed in the accompanying claims.

What is claimed is:

1. A sensor device, comprising:
   first sensors;
   second sensors configured to form capacitances with the first sensors;
   a sensor transmitter connected to the first sensors and configured to supply driving signals having a first frequency to the first sensors; and
   a sensor receiver connected to the second sensors and configured to receive sensing signals from the second sensors,
   wherein the sensor receiver comprises:
   a multipath filter having a center frequency set to the first frequency; and
   a first chopper integrator connected to the multipath filter, and having a center frequency set to the first frequency,
   wherein the multipath filter includes a plurality of first paths, connected in parallel to each other between a first input terminal and a first output terminal, and a plurality of second paths, connected in parallel to each other between a second input terminal and a second output terminal, and
   wherein the first paths and the second paths share filters,
   wherein one of the first paths successively includes a first input mixer, a first filter, and a first output mixer,
   wherein one of the second paths includes a second input mixer and a second output mixer,
   wherein an output terminal of the second input mixer is connected to an input terminal of the first filter, and
   wherein an input terminal of the second output mixer is connected to an output terminal of the first filter.

2. The sensor device according to claim 1, wherein the first chopper integrator comprises:
   an amplifier; and
   a chopper circuit connected between an input terminal of the amplifier and an output terminal of the multipath filter.

3. The sensor device according to claim 2, wherein the first chopper integrator comprises:
   a first integration capacitor connected between a first input terminal and a first output terminal of the amplifier; and
   a first reset switch connected in parallel to the first integration capacitor.

4. The sensor device according to claim 3, wherein the first chopper integrator comprises:
   a second integration capacitor connected between a second input terminal and a second output terminal of the amplifier; and
   a second reset switch connected in parallel to the second integration capacitor.

5. The sensor device according to claim 4, wherein the chopper circuit comprises:
   a first switch configured to connect the first output terminal of the multipath filter to the first input terminal of the amplifier;
   a second switch configured to connect the second output terminal of the multipath filter to the second input terminal of the amplifier;
   a third switch configured to connect the first output terminal of the multipath filter to the second input terminal of the amplifier; and a fourth switch configured to connect the second output terminal of the multipath filter to the first input terminal of the amplifier.

6. The sensor device according to claim 5, wherein a period during which the first switch and the second switch are turned on does not overlap a period during which the third switch and the fourth switch are turned on.

7. The sensor device according to claim 6,
wherein the first switch and the second switch are turned on in response to a first clock signal,
wherein the third switch and the fourth switch are turned on in response to a second clock signal,
wherein a frequency of the first clock signal and a frequency of the second clock signal are identical with the first frequency, and
wherein the first clock signal and the second clock signal differ in phase from each other.

8. The sensor device according to claim 1,
wherein a frequency and a phase of a first input clock signal received by the first input mixer are identical with a frequency and a phase of a first output clock signal received by the first output mixer,
wherein a frequency and a phase of a second input clock signal received by the second input mixer are identical with a frequency and a phase of a second output clock signal received by the second output mixer,
wherein the frequency of the first input clock signal is identical with the frequency of the second input clock signal, and
wherein the phase of the first input clock signal differs from the phase of the second input clock signal.

9. The sensor device according to claim 1, wherein the sensor receiver further comprises a second chopper integrator connected to an output terminal of the multipath filter and having a center frequency set to the first frequency.

10. The sensor device according to claim 9,
wherein a frequency of a clock signal provided to the first chopper integrator is identical with a frequency of a clock signal provided to the second chopper integrator, and
wherein a phase of the clock signal provided to the first chopper integrator differs from a phase of the clock signal provided to the second chopper integrator.

11. The sensor device according to claim 10, wherein the phase of the clock signal provided to the first chopper integrator differs by 90° from the phase of the clock signal provided to the second chopper integrator.

12. A sensor device, comprising:
first sensors;
second sensors configured to form capacitances with the first sensors;
a sensor transmitter connected to the first sensors and configured to supply driving signals having a first frequency to the first sensors; and
a sensor receiver connected to the second sensors and configured to receive sensing signals from the second sensors,
wherein the sensor receiver comprises:
a multipath filter having a center frequency set to the first frequency; and
a first chopper integrator connected to the multipath filter, and having a center frequency set to the first frequency,
wherein the multipath filter includes a plurality of paths connected in parallel to each other between an input terminal of the multipath filter and an output terminal of the multipath filter,
wherein a first path of the plurality of paths successively includes a first input mixer, a first filter, and a first output mixer, and
wherein a frequency and a phase of a first input clock signal received by the first input mixer are identical with a frequency and a phase of a first output clock signal received by the first output mixer.

13. The sensor device according to claim 12,
wherein a second path of the plurality of paths successively includes a second input mixer, a second filter, and a second output mixer,
wherein a frequency and a phase of a second input clock signal received by the second input mixer are identical with a frequency and a phase of a second output clock signal received by the second output mixer,
wherein the frequency of the first input clock signal is identical with the frequency of the second input clock signal, and
wherein the phase of the first input clock signal differs from the phase of the second input clock signal.

14. A method of driving a sensor device, comprising:
supplying driving signals having a first frequency to first sensors;
receiving sensing signals from two adjacent second sensors configured to form a capacitance with the first sensors;
amplifying a difference between the sensing signals;
filtering the amplified signal through a multipath filter having a center frequency set to the first frequency; and
integrating an output signal of the multipath filter through a first chopper integrator having a center frequency set to the first frequency,
wherein the first chopper integrator comprises:
an amplifier;
a chopper circuit connected between input terminals of the amplifier and output terminals of the multipath filter:
a first integration capacitor connected between a first input terminal of the amplifier and a first output terminal of the amplifier;
a first reset switch connected in parallel to the first integration capacitor;
a second integration capacitor connected between a second input terminal of the amplifier and a second output terminal of the amplifier; and
a second reset switch connected in parallel to the second integration capacitor,
wherein the chopper circuit comprises:
a first switch configured to connect a first output terminal of the multipath filter to the first input terminal of the amplifier;
a second switch configured to connect a second output terminal of the multipath filter to the second input terminal of the amplifier;
a third switch configured to connect the first output terminal of the multipath filter to the second input terminal of the amplifier; and
a fourth switch configured to connect the second output terminal of the multipath filter to the first input terminal of the amplifier,
wherein the first switch and the second switch are turned on in response to a first clock signal,
wherein the third switch and the fourth switch are turned on in response to a second clock signal,
wherein a frequency of the first clock signal and a frequency of the second clock signal are identical with the first frequency, and wherein the first clock signal and the second clock signal differ in phase from each other.

15. The method according to claim 14, wherein a period during which the first switch and the second switch are turned on does not overlap a period during which the third switch and the fourth switch are turned on.

\* \* \* \* \*